United States Patent
Bromberg et al.

(10) Patent No.: US 6,910,027 B2
(45) Date of Patent: Jun. 21, 2005

(54) SYSTEM AND METHOD OF KNOWLEDGE ARCHITECTURE

(75) Inventors: David Bromberg, Rye Brook, NY (US); Steven Roberts, Rutherford, NJ (US)

(73) Assignee: Acappella Software, Inc., Harrison, NY (US)

(*) Notice: Subject to any disclaimer, the term of this patent is extended or adjusted under 35 U.S.C. 154(b) by 0 days.

(21) Appl. No.: 10/342,945

(22) Filed: Jan. 15, 2003

(65) Prior Publication Data

US 2003/0187810 A1 Oct. 2, 2003

Related U.S. Application Data

(63) Continuation of application No. 09/361,891, filed on Jul. 27, 1999, now Pat. No. 6,529,889.

(51) Int. Cl.$^7$ .............................................. G06N 5/02
(52) U.S. Cl. ............................ 706/46; 706/45; 706/47
(58) Field of Search ............................. 706/46, 45, 47

(56) References Cited

U.S. PATENT DOCUMENTS 6,292,792 B1 * 9/2001 Baffes et al. ................. 706/45

* cited by examiner

*Primary Examiner*—Anthony Knight
*Assistant Examiner*—Joseph P. Hirl
(74) *Attorney, Agent, or Firm*—Lackenbach Siegel, LLP

(57) ABSTRACT

The system of knowledge architecture transforms knowledge of an expert by capturing the knowledge as structured content; and using the structured content in a software format. Knowledge is captured by mapping the structured content into topics and questions and/or a structured document, inputting said structured content, and storing said structured content. The structured content is then prepared for use as a specialized software application, next the prepared structured content is presented to a user where interaction with a user in a software format causes the forming of a narrative end-product based upon the data structure that communicates the findings and opinions of the expert knowledge.

1 Claim, 29 Drawing Sheets

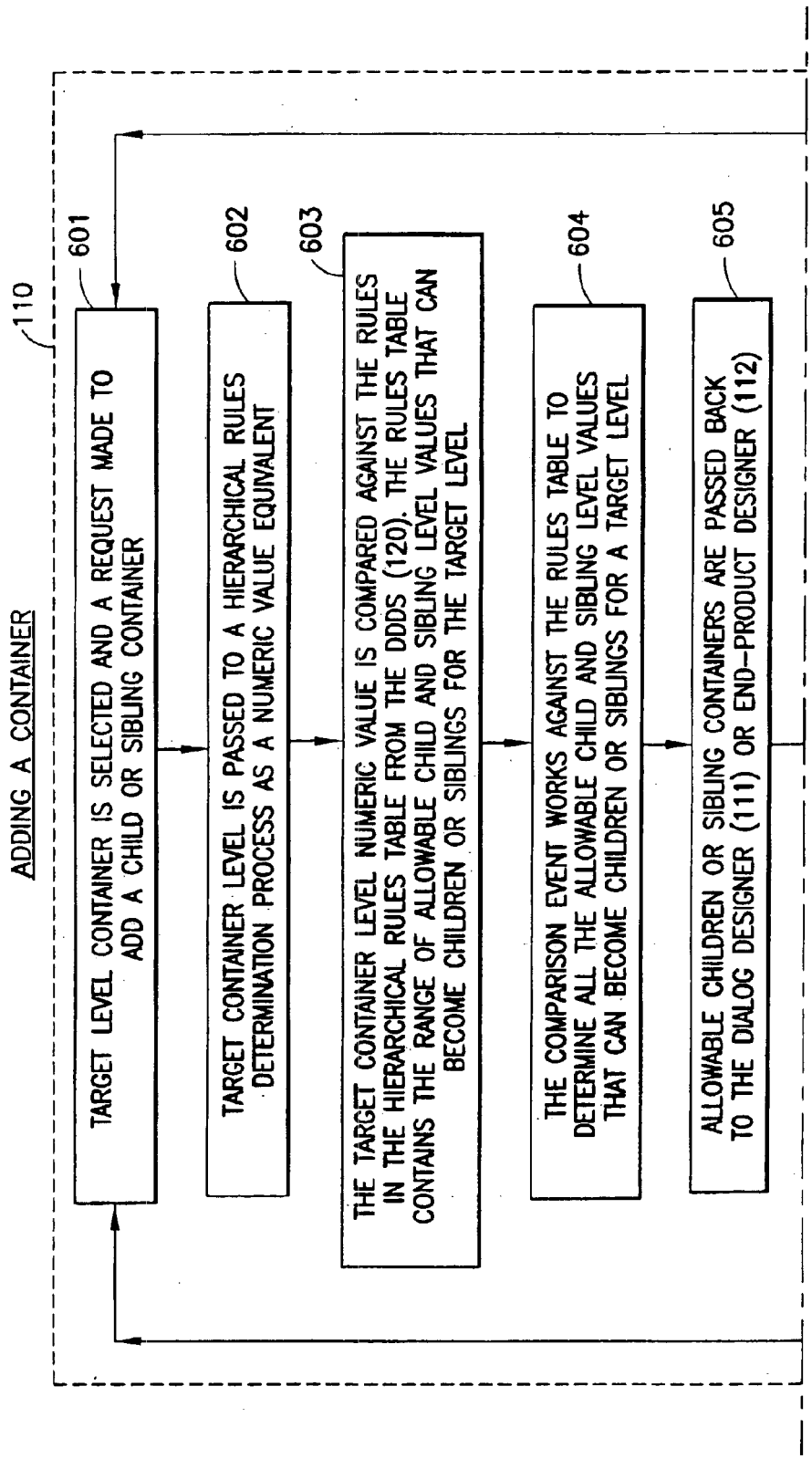

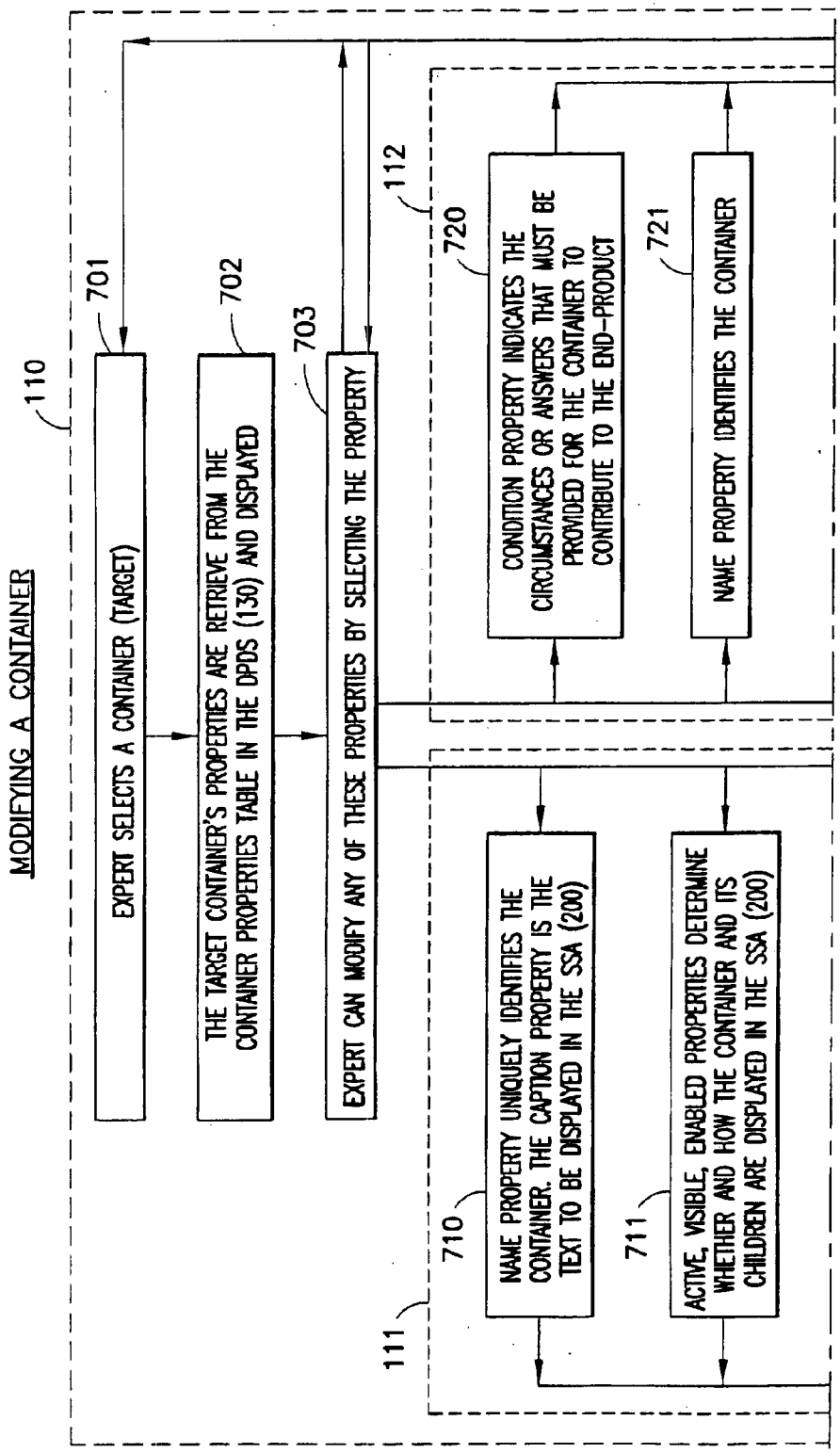

| FIG.8A |
| FIG.8B |

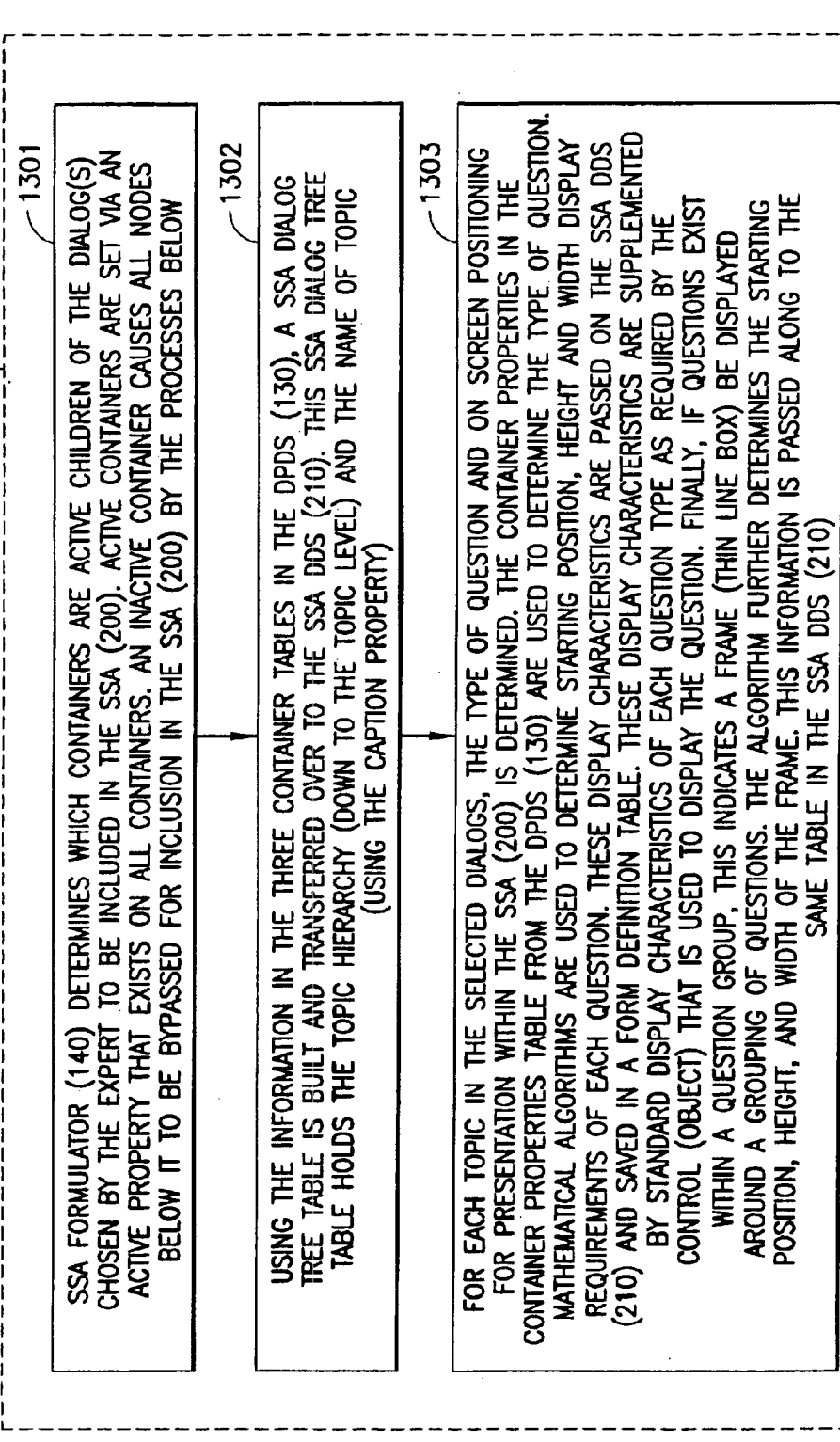

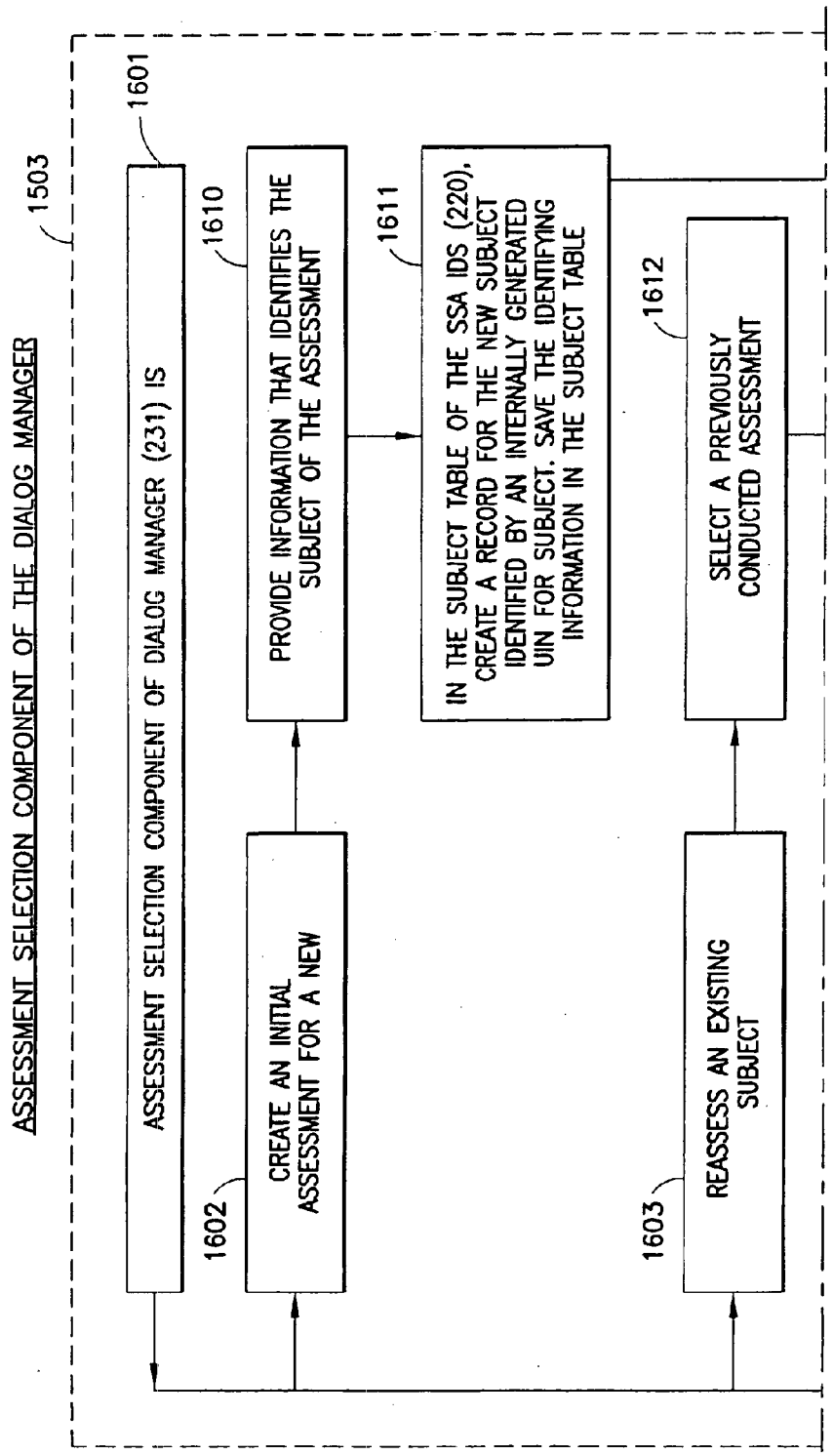

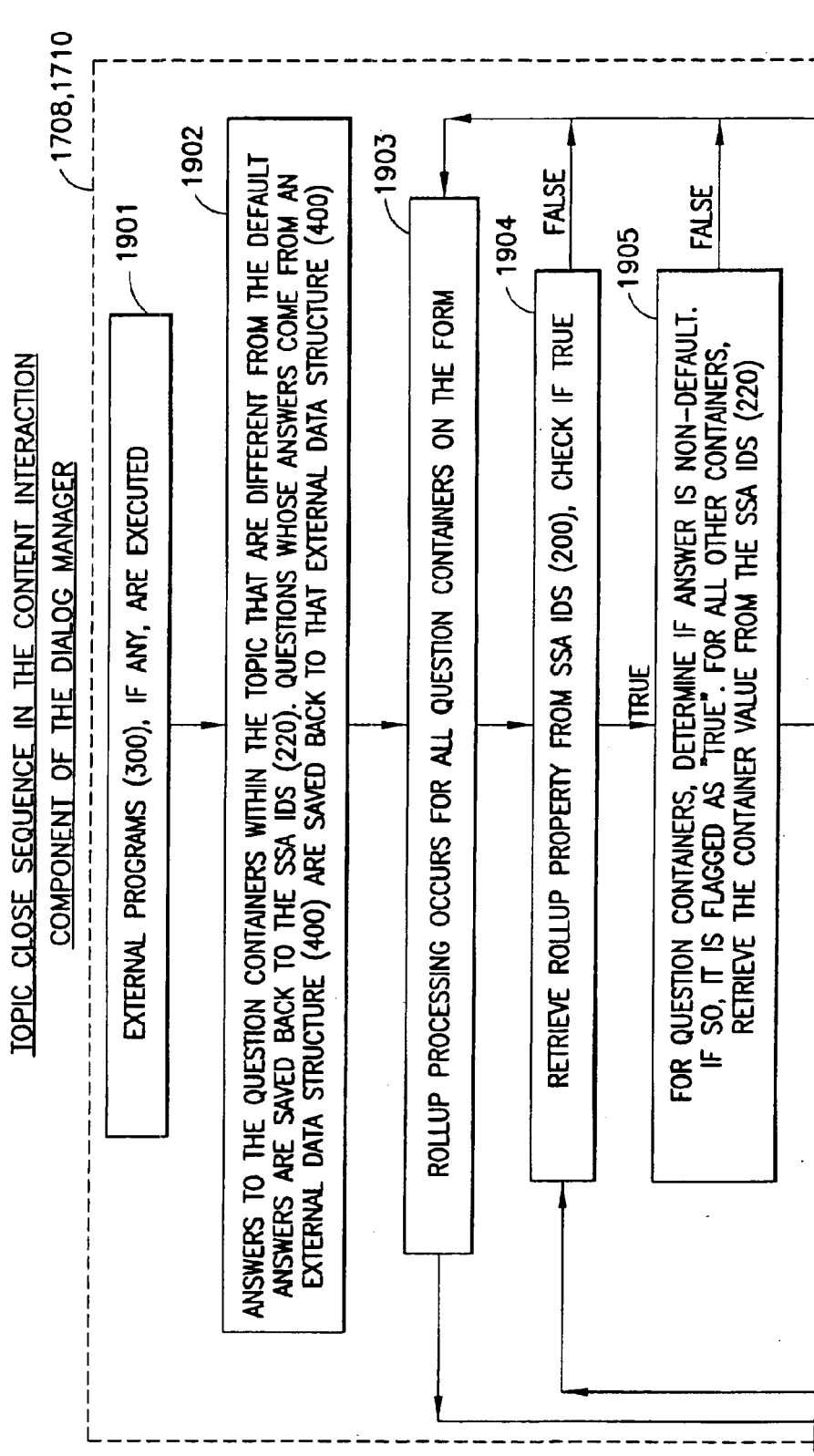

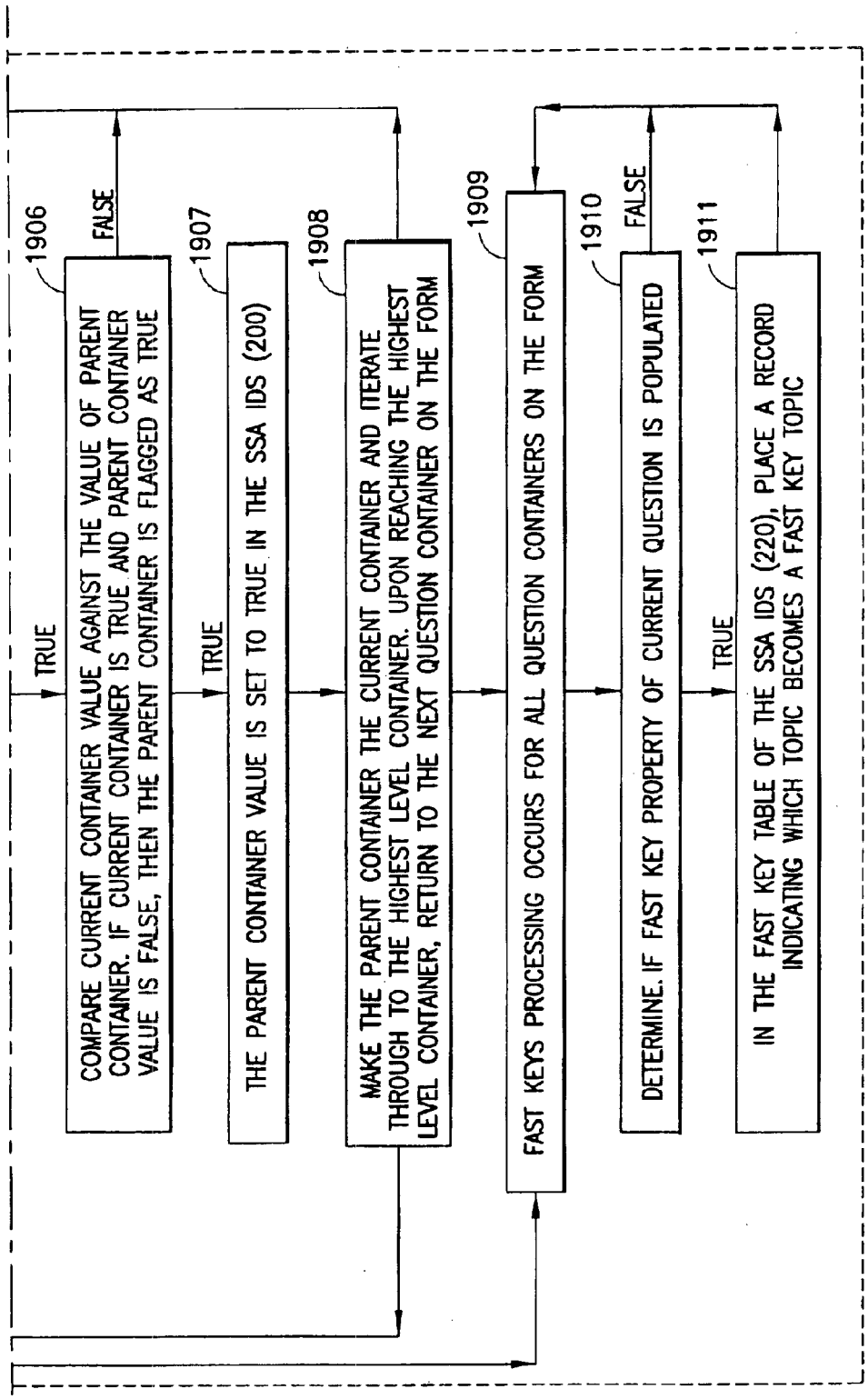

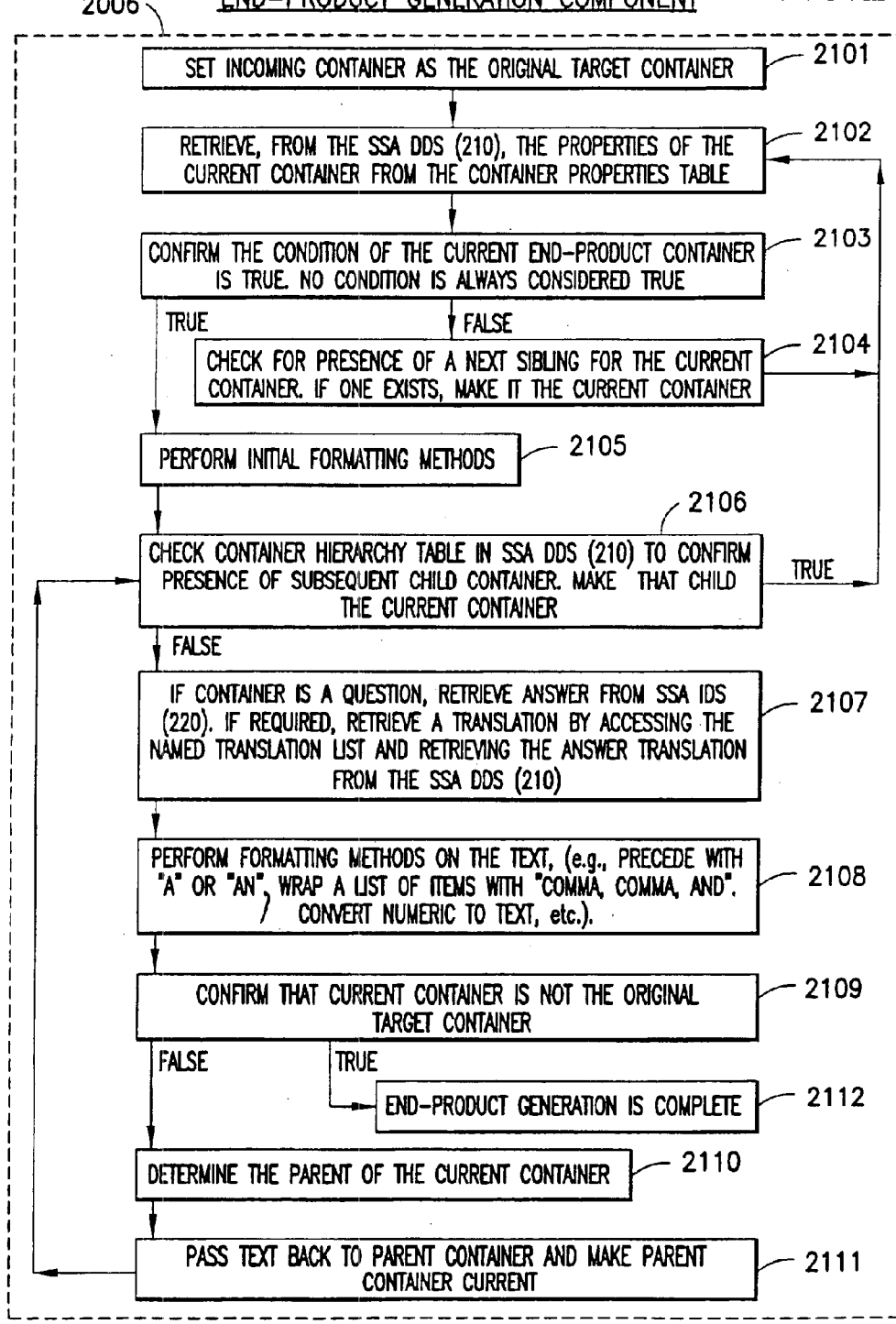

SYSTEM AND METHOD OF KNOWLEDGE ARCHITECTURE

This application is a continuation of U.S. patent application Ser. No. 09/361,891 filed on Jul. 27, 1999 now U.S. Pat. No. 6,529,889.

FIELD OF THE INVENTION

This invention refers to the capture, organization, storage and presentation of expert knowledge and the facilitation of the interaction with that knowledge by other professionals. This invention also produces end-products relating to the professional's activities.

BACKGROUND OF THE INVENTION

An expert is considered to be someone who has extensive knowledge on a given topic. Traditionally, if an expert wanted to record his knowledge into a usable format, he would write a book or article, put thoughts into a diary or file, etc. This "published" knowledge would then be available for use by others who could learn from it and utilize it.

In the 1970s and 1980s, the continuing development of computing technique and power resulted in a software category of "expert systems". The purpose behind expert systems is to take the expert's knowledge of a situation, event, circumstance, etc. and translate that into a software application, usable by other professionals who are working on a similar problem. In using the expert system, the professional follows through the series of steps, as designated by the software, to both "correctly" apply an expert process against the event under consideration and to reach an appropriate conclusion to that event.

The key to the expert system is that the steps that the software presents to the user/professional are based on a series of rules whereby the conduct or answers within one step determines what the next step should be. Once these rules are established within the software application, the user/professional is required to follow the steps as they are presented to him in order for the software (and therefore the user/professional) to function correctly. The user/professional found that differences in approach, timing, unaccounted factors, etc. led to so many exceptions to the stepwise rules of the expert system, that the system became essentially ineffective.

As well, the rules of presentation for the process often closely reflect the personal strategic approach to the situation of the authoring expert. This means it does not necessarily meet the strategic needs and expectations of the professionals who uses the expert system.

Furthermore, any changes to the expert system to reflect alternative models, unaccounted circumstances, and just general evolution of knowledge about the event, are very labor intensive and expensive to perform leaving the expert system essentially static once it has been implemented. Over time, the expert system is also increasingly limited in utility. The user/professional has determined that expert systems lack important flexibility and are lacking from a conceptual standpoint. As a result, expert systems have failed.

Having recognized the shortcomings of expert systems, the software industry introduced Decision Support Software (DSS). In DSS, the user is asked to gather facts and supply that information to the software application. The DSS then uses that information to determine the likelihood that the professional can expect a particular outcome or may be dealing with a certain type of event. However, the wizened professional knows the factors and outcomes before they begin inputting information into the DSS. That makes the use of the DSS a trite exercise. Then when the DSS is needed for support on more complex issues, the professional finds the DSS fails to account for many of the possible factors that contribute to that particular situation. It also comes up short in recognizing the many permutations that the situation entails.

The DSS strategy, much like the expert system, is expensive and costly to maintain and upgrade. DSS also does not provide the required necessary flexibility because it too is rule bound in determining likely answers to a problem or outcomes of events. So it, too, is a conceptual failure except in cases where a DSS is required because expertise is rare and/or the financial backing is strong allowing the DSS knowledge base maintenance and upgrade cycles to continue.

Stepping into the gap left by expert systems and decision support software is specialty report writing software products that attempt to alleviate the administrative and bureaucratic burden faced by professionals. The strategy behind these software applications is that the professional answers a series of questions after which the software generates a narrative report. However, these software applications have drawn too closely on expert systems approach and have therefore inherited their technological shortcomings, i.e., predetermined step-wise use and lack of flexibility in content coverage.

Specialty report writers introduce a new problem. The narrative generation capability is usually built around standard or stock paragraphs or sentences where the answers to the questions determined the text to pull in or merge into the final document. The strategy here is a sophisticated hybrid of word-processing cut and paste and mail merge technologies. These strategies work best when the resulting documents are standard forms for an industry. Legal, financial, and insurance disciplines have benefited most from this software category.

To make this strategy work, programmers must build an infrastructure for document generation including the construction of databases, user interfaces including forms which display all the questions, and the building of the merge functions which drive the document generation. Much like expert systems and decision support, development, maintenance, and upgrade cycles are very expensive. The resulting software is, once again, relatively static and limits the creative approach of the user/professional. And they produce rigid, stratified final documents that limit the number of disciplines to which this kind of solution finds applicability.

With no other solution in sight, most professionals are left to their word-processors in order to produce their necessary communications. Unfortunately, communication skills vary across any given professional group. Further complicating the issue is that management must interpret the content of a report because different writers/professionals use a multiplicity of terms and different approaches when writing a report—even if the facts are the same. Comparison of reports across different situations is therefore extremely laborious. As well, each professional, depending on training, experience, and specialty, may focus on different aspects of a situation leaving gaps in coverage. In fact, in many cases the time and effort necessary to fully document a situation or event is an increasingly unrealistic and expensive burden. It is therefore difficult for management or other recipients, in reviewing a compiled report, to potentially catch the full understanding of the situation.

This problem has therefore become one of managing information and knowledge. The first attempts at managing knowledge can be referred to as disaggregation strategies. By breaking the professional process into its components, in essence the facts or information the professional was gathering, and perhaps the conclusions they were drawing, organizations have turned the professional process into information that can be readily accessed and shared. Put more simply, organizations develop checklists for their professionals to complete.

This strategy has serious downsides. First, to computerize the checklists still requires the expense of programmers to build the data structures and the interfaces. Again, changes are time consuming and costly.

Furthermore, the report writing side of the process is usually eliminated because of its inherent complexity. This has two repercussions: 1) the professional has to complete the checklist but still has to write a report. There is no time saving in this process, only a doubling of the work; 2) or only checklist completion is required for task completion. This strategy ultimately reduces the scope and amount of information gathered and produces less knowledge about events as opposed to more.

This strategy for managing knowledge therefore falls short.

More recently, knowledge management has come into existence as a software category whose purpose is to facilitate an organization's ability to share its knowledge more effectively.

There are three major areas of focus in knowledge management: 1) management of information sources or resources; 2) management of expertise; 3) management of collaboration among professionals.

In managing resources, the assumption is that every document, picture, web page, video clip, e-mail, etc. produced by an organization contains valuable information that may be useful to someone elsewhere in the organization. In order to lead people to the resource, the item must be discoverable and retrievable. Knowledge Management software automates the categorization of these resources by key words, type, phrases, elements, etc. The person searching for the information can navigate or search the categories to find an appropriate information resource. Still, when they get there, they do not know until they review the resource, if the information is of help to them. This use of knowledge management may help in discovery and retrieval but it offers no guarantee of utility.

In managing expertise, knowledge management recognizes that large organizations have a great deal of hidden knowledge and experience, i.e., people with skills that are not widely known for various reasons. Knowledge Management relies upon a database of people's expertise to allow those in need to search out required skills within the organization that may be able to contribute to a solution to a problem. This allows the knowledge seeker to know whom to contact within the organization. However, this paradigm expects that the expert has the time to commit to the seeker, is motivated to offer advisement, and is able to communicate his skill set. Disparities in geography and time zones can limit the effectiveness of this strategy.

With respect to collaboration, knowledge management attempts to reduce disparities in geography and time by providing a software solution that allows members of a group to communicate despite differences in geography or time zones.

Overall, knowledge management has yet to crack the barrier of direct capture of expertise and thus perpetuates the lack of direct support for the professional process within a given discipline.

SUMMARY OF THE INVENTION

It is an object of the present invention to provide an improved method for the capture, organization, storage, and presentation of expert knowledge.

It is a further object of the present invention to provide an improved system for the facilitation of the interaction with expert knowledge by other professionals.

It is another object of the present invention to generate narratives and other elements such as graphics and tables, to provide the necessary end-products that the professional requires as part of his ongoing activities.

Thus, in sharp contrast to the prior art, the present invention is based on the practice of Knowledge Architecture.

Knowledge Architecture is focused on the capture and use of an expert's knowledge in any profession without limitation. In order to capture an expert's knowledge, an expert or group thereof must decide on the focus or specific subject matter that they wish to capture. For instance, a speech and language professional may wish to capture his knowledge of the assessment process for autistic children. By capturing this knowledge, he will be able to eventually share his expertise and support the assessment process as conducted by other professionals in the speech and language discipline.

After deciding the subject matter of the expertise, the expert(s) begins to organize and define his knowledge. This requires translating his knowledge into a series of topics and questions that define his professional process. With experience, an expert increasingly organizes his understandings into a hierarchical set of topics that become a guiding map for his thought processes. For each topic within the hierarchy, the professional has a series of questions he will ask himself, should the topic be relevant to the situation. These questions cover the facts he observes, the information he needs to gather, choices that he must make, judgements that he must consider, or relationships between factors that might exist.

For instance, the speech and language professional looks at a number of different subdiscipline areas when assessing a child (e.g., hearing, voice, fluency, language). He gathers information on physical factors, performance, behavior, and capability. He also makes judgements as to whether the child is performing to expectation relative to peer groups. Selection of whether to analyze a subdiscipline area is at the discretion of the professional so not all children are assessed in all areas each time.

These questions and the discretion in application represent the analytical capability that the expert brings to the situation. This analytical capability is the single most important asset the expert brings to a situation.

The combination of hierarchically organized topics and associated questions can be called "structured content". The present invention allows the expert to record his structured content as raw material. This raw material structured content is then stored in a data structure.

Structured content (as comprised of topics and questions) often is only one part of the ongoing activities of the professional. Professionals usually communicate their findings and opinions, often in the form of a narrative.

Following from the topics and questions, the present invention offers the opportunity to script narratives (and accompanying graphs and charts) that draw upon the answers to the questions. The expert can therefore design an end-product that communicates his findings and opinions.

Much like the structured content of the topics and questions, the end-product can be organized as structured content, this time in the form of the hierarchy used when writing a document. The breakdown reflects the infrastructure of a document consisting of sections, subsections, paragraphs, sentences, phrases, and snippets (the written word). All levels above the snippet are organizing levels that represent a hierarchy for the written word.

Again, the present invention offers a methodology for developing an end-product and storing this as raw structured content. The end-product methodology primarily focuses on a narrative generating capability that offers very sophisticated control over the way narrative is brought together right down to the micro-level. This unique methodology of narrative generation results in a very fluid and dynamic system for pulling together text that sounds more natural than that produced by prior generations of specialty report writers.

As raw material, the two forms of structured content captured within the present invention are not usable by other professionals in that industry. To make it available to them, the captured raw material must be prepared and presented in the form of a specialized software application (SSA). This present invention has a methodology for conversion of the raw material into a presentable format. The raw material is prepared to meet the display and other requirements of this present invention's proprietary interface, which is the core of the SSA, for presentation of and interaction with the structured content.

With respect to topics and questions, the proprietary interface has two display requirements. In one region on the screen is a table of contents representing the topic hierarchy (also referred to as the dialog tree). A second region on the screen is used to display the questions for a selected topic (also known as the topic area).

The raw structured content of the topics is converted into the hierarchy of topics that acts as the table of contents for the user/professional. The preparation process uses the raw question material to determine question positions and results are stored along with other key question information. When a user/professional selects a topic inside the SSA, the processed question information is used to dynamically build and present questions to the user.

Since questions are presented to the user to be answered, this present invention also automates the preparation of a storage structure to hold the answers to the user/professional questions.

With respect to the potential end-products of an SSA, the proprietary interface offers the user/professional an opportunity to select end-products (or parts thereof) he wishes to generate. When preparing the raw material of the end-product, the various end-products available to the SSA are stored in a data structure accessible by the SSA. The end-product generation logic is also converted into a format that is usable within the SSA and stored in an appropriate structure accessible by the SSA.

Having processed all the raw material into a format that is usable by the present invention's proprietary interface, the user/professional opens the SSA and is presented with the processed structured content via the proprietary interface. When the user/professional is presented with questions and information, the user/professional interacts with those questions. Any answers he provides are stored in a data structure.

Once the user/professional is satisfied he has answered all questions relevant to the subject under consideration, the user/professional requests the generation of an end-product. As part of the standard interface, the user/professional is able to select the end-products he wishes to generate. Having selected the end-products, or portions thereof, the SSA then proceeds to draw upon the answers to the questions and dynamically build narrative and other elements of an end-product.

The end-product, once completely generated, is saved as a file external to the SSA. The SSA can launch an appropriate external application and open the generated end-product into that external application (e.g., word-processor). At that point, the user/professional can make any free-form changes to the end-product he so desires.

The present invention has the unique feature of allowing the design of the structured content to be developed with no or minimal intervention by software programmers. In other words, the expert(s) can build the SSA and its end-products without the assistance of software programmers. And the expert has full and simplified control over the evolution of changes to the product and the timing of release of those changes.

COMPARISON TO PRIOR ART

Knowledge Architecture, relative to the prior art, brings together the best that the prior art has offered, overcomes its serious shortcomings, and establishes new practices in software development.

For instance, expert systems attempted to capture expert knowledge but considered expert knowledge the application of rules related to a professional process. In Knowledge Architecture, the rules of the professional process are assumed known by the professional and are therefore not considered to be appropriate for inclusion.

Instead, it is assumed the expert requires support, not specific guidance, for his observational and judgmental acts. These observational and judgmental acts are expressed within Knowledge Architecture as questions, importantly, without rules as to how or when in the professional process they should be asked or applied.

Having freed Knowledge Architecture from the requirement of having to establish rules related to the navigation of the application, conceptually the expert must focus in on the theoretical organization and subsequent questions that are used in the conduct of the professional endeavor. This theoretical organization, or hierarchy of topics, and their related questions, is the "structured" content that Knowledge Architecture attempts to capture and use. By allowing the expert to directly input this content into a software application, the normal costs and efforts associated with this type of knowledge capture and software development is significantly reduced.

Remaining consistent with the mission of Knowledge Architecture, when the structured content is presented to an SSA user, he can navigate anywhere within the hierarchy and answer any question in any order. With no rules to follow, the presentation of knowledge (i.e., structured content) via Knowledge Architecture achieves the standard of an open architecture for knowledge.

This stands in sharp contrast to the expert systems wherein rules decide, based on one set of answers by the user/professional, what questions should next appear to the same user/professional. Problems arise when the sequence of questions and answers in the software do not fully adhere to the situation. The user/professional is still required to provide an answer he does not necessarily feel fits the situation. Within Knowledge Architecture, should exceptions to the rules occur, the user/professional simply moves on and/or makes free-form changes to the end-product that account for the exception. This Knowledge Architecture philosophy lends to the user/professional, great flexibility in the use and application of the knowledge contained with the SSA.

Moreover, given that no rules of usage need to be implemented and the expert inputs the structured content himself, as knowledge evolves, the expert can sit down and evolve the SSA at will. Knowledge Architecture allows the knowledge base within the SSA to grow in an efficient and cost-effective manner.

With respect to Decision Support Systems, they rely upon rules to determine possible outcomes or the likelihood of an event. As with Expert Systems, this strategy carries a maintenance, upgrade, and; usage burden. Once again, Knowledge Architecture bypasses all the inherent burdens that come with the implementation of a rules based system. Furthermore, Knowledge Architecture assumes the user/professional knows what decisions need to be made, the factors that go into the decision making process, and should maintain the discretion of making or not making those decisions. Knowledge Architecture understands that the seasoned user/professional has likely considered all these factors, and come to his conclusions prior to ever explicitly answering any questions within a piece of software.

These factors give the expert his authentication and credence to his credentials. Knowledge Architecture supports these elements of the professional's intellectual process by not making judgements on behalf of the professional, thereby overcoming an important psychological barrier.

Specialty report writing software shares with Knowledge Architecture a purpose of producing an end-product (a narrative report). Like Knowledge Architecture, specialty report writing software moves beyond the word-processor as a knowledge resource. Both strategies produce a consistent infrastructure in terms of the sequence of presentation of information via a narrative report. This makes the management task of searching for relevant material and comparison between end-products much more manageable. Both strategies also try to raise the level of quality of communication. However this is where the similarities end.

Knowledge Architecture in the present invention directly captures structured content from the expert—i.e., the knowledge capture phase does not require programming teams.

In the present invention, Knowledge Architecture uses an open architecture for the presentation of knowledge wherein access to structured content is freeform and rule free. Most if not all the report writing systems available direct the path of questioning that the user/professional sees and experiences.

In the present invention, there is an automated preparation process that converts raw structured content into a finished product as compared to the available report writing software which requires teams of programmers to convert raw material into the finished software product.

In the present invention, the detailed control over the narrative leads to a very fluid and dynamic narrative generation capability. Many report writers suffer from narrative generation that is very static and rigid, following from reliance upon preset paragraphs or sentences. As such, it has worked for legal, financial, and insurance documentation. However, for the professional whose communications are less rigid and an inherent part of their professional identity, the stilted, rigid writing approach offered by these specialty report writers has not offered the right solution.

The process within the present invention goes well beyond a sophisticated mail merge or cut and paste strategy. The present invention includes detailed control over the narrative, allowing the sentence to be manipulated down to the punctuation. Such fine control over the written word, along with the supplementary tools for narrative generation, produces an excellent written narrative. As a result, the present invention produces a fluid, natural style of narrative that closely reflects the professionally written document. With a higher quality of narrative, more professionals will welcome and adopt the administrative support that Knowledge Architecture offers.

The present invention improves upon the disaggregation strategy of designing a database with an interface to capture professional information. The greatest hurdle faced in this disaggregation strategy, again, is the time and cost burden of bringing in programming teams to build the software system. Once again, since content is directly provided and controlled by the expert, the time and cost problem is resolved, the scope of potential questioning is extended, and barriers are broken with respect to the amount of information that can be gathered. In addition, the present invention includes the narrative generation capability that can be used to more effectively communicate the results of the information gathering process, all the while relieving the user/professional of the administrative burden that is not inherently available within the disaggregation strategy.

With respect to Knowledge Management, Knowledge Architecture is an entirely different domain. First, Knowledge Management organizes previously existing knowledge stored in various structured and unstructured forms such as documents, web pages, etc. Knowledge Architecture of the present invention does not categorize or organize existing information resources. Knowledge Architecture attempts to capture the organization and structure of the tacit, implicit, and hidden knowledge that resides within experts.

Second, Knowledge Management manages expertise by offering searchable databases on what a person's knowledge encompasses. This might include pointers to documents written by the expert. However, the database contains knowledge "about their expertise", it does not necessarily contain "detailed knowledge of their expertise". For instance, the software may know that an individual has expertise in building roads through a jungle however there may be no information describing the process of building a road in the jungle—which he would have.

The purpose of this type of Knowledge Management software would be to offer the location of the individual so that others building roads under similar circumstances could contact him. Of course, transfer of knowledge using this Knowledge Management strategy depends on making contact with the expert and the quality of the communication from the expert.

With Knowledge Architecture, an SSA could exist that has captured the knowledge of the expert and is readily and consistently available regardless of the availability of the expert. As a result, detailed information on the considerations related to materials and method of building a road in a jungle would be available through use of the present invention. Not only that, but by using the SSA, the knowledge of road building is disaggregated into its components offering a massive qualitative data store on the process of road building.

Finally, Knowledge Management facilitates collaboration of persons across time and geography. It allows persons to collaborate on a problem, solution, documents, etc. The present invention also facilitates collaboration but the primary focus of its collaborative capability is with respect to disaggregated knowledge, i.e., Knowledge Architecture of the present invention facilitates collaboration on the gathering of specific information by persons separated due to time or geography. Furthermore, the present invention produces an end-product such as a document that could then be the subject of a collaborative event within the domain of Knowledge Management.

Knowledge Architecture of the present invention supplements and compliments the domain of Knowledge Management.

Overall, Knowledge Architecture as implemented via the present invention selects only appropriate best practices of the prior art, pushing beyond any previous limitations in strategy and overcoming the shortcomings in execution inherent in the prior art. Knowledge Architecture and the present invention create a whole new category of business process and technology making the development of specialized software applications a highly manageable and affordable goal for any organization.

BRIEF DESCRIPTION OF THE DRAWINGS

A more complete understanding of the present invention and advantages thereof may be acquired upon consideration of the following detailed description of the invention when considered in connection with the accompanying drawings, in which like reference numerals indicate like features throughout the features thereof, and wherein;

FIG. 19 is a flow diagram representing the topic closure sequence in the content interaction component of the dialog manager according to the system and method of the invention;

FIG. 21 is a flow diagram representing the end-product generation component according to the system and method of the invention;

DETAILED DESCRIPTION OF THE INVENTION

Figure 1:
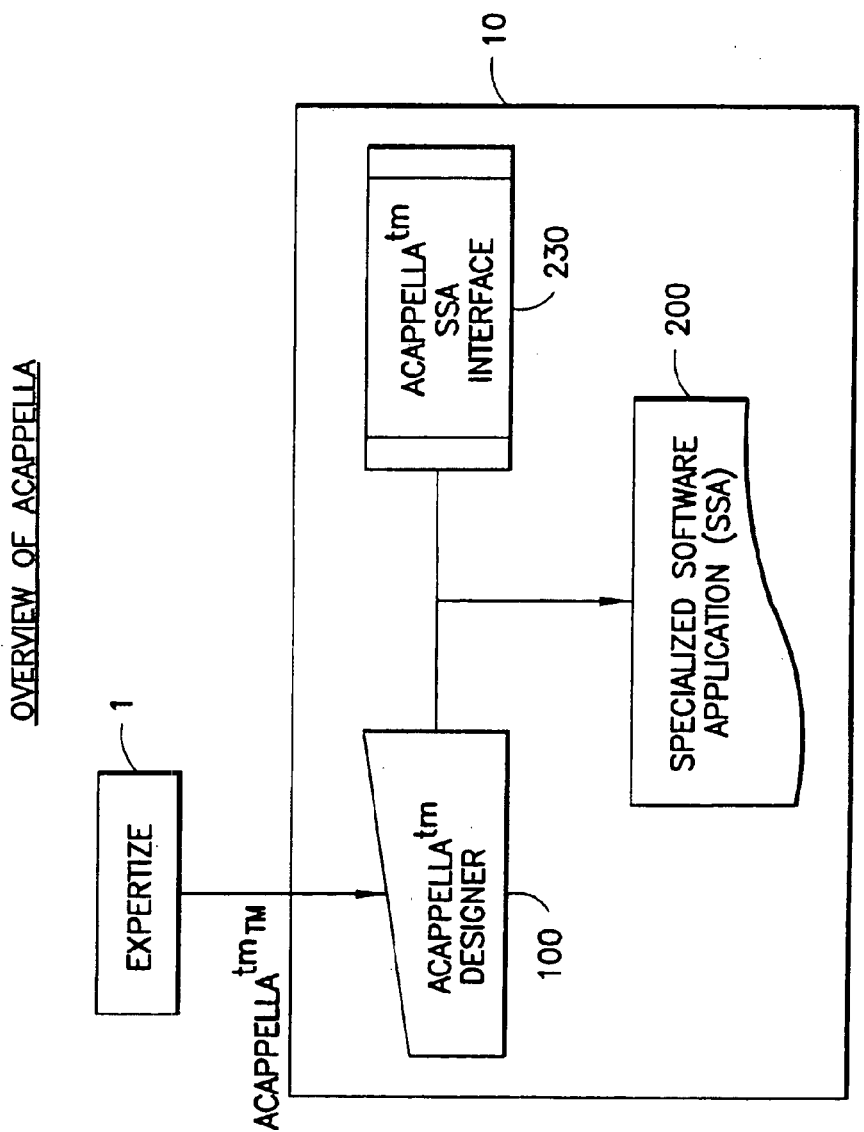
FIG. 1 is a flow diagram representing a broad overview of Acappella components according to the system and method of the invention.

The invention may in one aspect be described with reference to FIG. 1 with respect to an overview of the present invention, Knowledge Architecture and Acappella. The purpose of the present invention is to capture the skill, experience, understandings, wisdom, and know-how that defines the specialized knowledge that an expert brings when assessing, evaluating, reviewing, diagnosing, investigating, or analyzing a particular manner of situation, event, circumstance, or process. This captured knowledge is then converted into a Specialized Software Application (SSA), which is a standalone personal computer, networkable, or Internet based software application. Until the knowledge has been captured and converted into an SSA, the knowledge has remained hidden and usable only at the disposal of the expert. Once it is converted into an SSA, that knowledge can be made available to and accessible by anyone who has access to the SSA.

In order to build the SSA, expertise (1) must be captured within the Acappella Designer (100). The expertise (1), as captured by the Acappella Designer (100), is then converted into a format that is presentable through the Acappella SSA Interface (230). The presentation of expertise (1) via the Acappella SSA Interface (230) defines a Specialized Software Application (200). Acappella (10), the present invention, encompasses the functionality and processes as performed and conducted by the Acappella Designer (100), the Acappella SSA Interface (230) and the Specialized Software Application (200).

For the purpose of the present invention, expertise (1) must be translated into a form known as "structured content". Structured content begins with an understanding of how expertise is applied to a situation or event.

Expertise can be defined as a body of knowledge and skills that is applied against a situation or event. This body of knowledge flows from the learning and experiences the expert has undergone over time as they have exposed themselves to the situation or event in question. Over the course of time, the expert builds a warehouse of knowledge about the facts they can observe, the information they might gather, the judgements they could make, and the relationships that tend to exist between the elements he considers. When the expert enters a situation, he proceeds to work through his archive of questions, i.e., the expert determines the questions relevant to the situation and his answers to those questions. For instance, a speech and language pathologist who is assessing a child who is having difficulty producing speech sounds may ask himself, "Are the muscles of the tongue strong enough to form sound patterns?", "Is the mouth misshapen?", "What sounds in particular does the child have difficulty with?", "Does the child understand how to actually pronounce the sound?". In doing so, the expert is gathering data on the situation. In answering these questions, the appropriate data about the child is being gathered.

Expertise is further defined by the efficiency of the data gathering process. To effectively move through the archive of questions, the expert has, through the course of time, developed a powerful cognitive map that they proceed through to the appropriate questions. This map begins with broad areas of consideration or topics. Topics break down into more finely honed topics, moving from broad to specific. At appropriate points in this hierarchical map, the expert organizes appropriate questions that define the topic. The purpose of this hierarchy is to efficiently navigate down to topics and associated questions that are relevant to the event under consideration.

For the speech and language professional, the broadest topics are areas such as Hearing, Voice, Fluency, Phonology, and Language. Within language, there are three areas comprised of Form (understanding and use of the rules of language), Content (understanding of meaning), and Pragmatics (the social use of language). Each of these areas, in turn, break down into further topics, often based on the type of skills that require mastery. The expert is able to quickly identify where the differences from norm exist and quickly traverse the hierarchy into those topics and associated questions that are important to the child being assessed.

A secondary aspect of expertise is communication of findings. Experts are often called upon to produce some end-product, usually a narrative report that may contain graphs or charts of results. The reports follow directly from the information that has been gathered during the evaluative process. The reports usually have a structure or pattern of presentation. In essence, the pattern of presentation can be scripted. That is, within the present invention, an end-product can be scripted accordingly, based on a hierarchical presentation of information and written words that must be produced. So the second function of this invention is to provide a facility whereby the answers to the questions following from the evaluative process can be converted into an end-product that includes narrative generation.

Structured content therefore, is defined as the hierarchical relationship between topics and questions, and the infrastructure that is used to build an end-product, i.e., the hierarchy of presentation of information that is the content of a report that contains narrative and accompanying graphics and charts. Acappella (10) effectively and efficiently converts structured content into SSAs (200). And the Acappella SSA Interface (230) presents expert knowledge to the SSA user as defined by the structured content built using the Acappella Designer (100).

In the present invention, the expert directly controls the development of the end-product and the SSA (200) via the Acappella Designer (100). The Acappella Designer (100) is considered to act as a development environment. The expert himself or a facilitator working with the expert inputs structured content into the Acappella Designer (100). Note that anyone with basic computer competency is able to use the Acappella Designer (100), i.e., there is no need for the person to be a software programmer.

At any point during the development cycle, the expert can formulate an SSA (200) from the structured content as captured by the Acappella Designer (100). Within a matter of moments, the structured content is converted into a format that can be displayed through the Acappella SSA Interface (230). The expert or another professional can then interact with the SSA (200), thereby becoming an SSA user. The SSA user enters his observations and judgements as answers to the questions and can choose to produce an end-product, such as a report, that follows from the answers to the questions. The SSA (200), once generated, is a standalone, networkable, or world wide web based software application that incorporates the Acappella SSA Interface (230) however it runs separately from and without any further support from the Acappella Designer (100).

Knowledge Architecture, as per FIG. 1, is encompassed within the steps required to move from expertise through the production of an SSA via Acappella.

Figure 2:
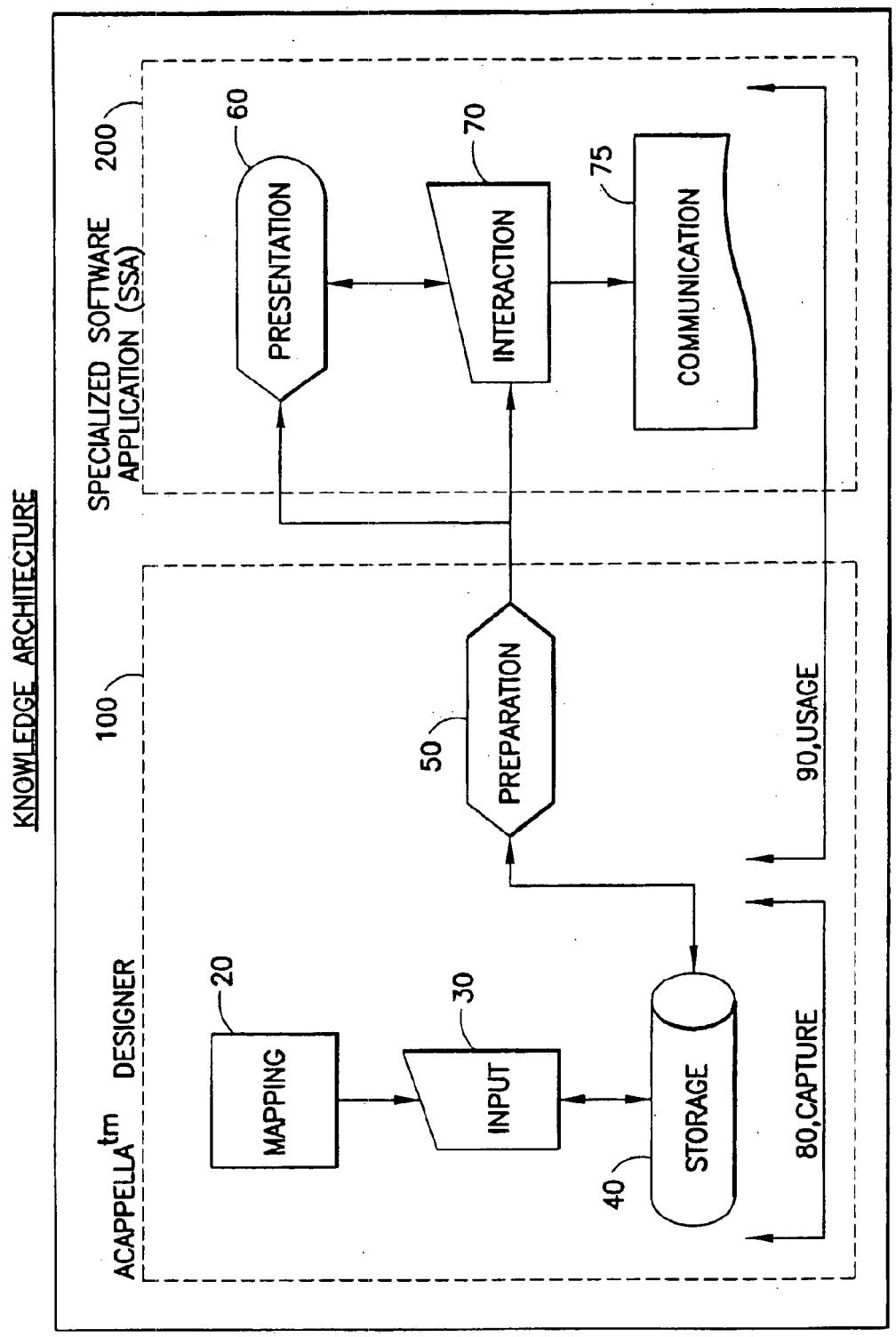
FIG. 2 is a flow diagram representing a broad overview of Knowledge Architecture and the method of the invention.

FIG. 2 indicates the process of the capture (80) and usage (90) of structured content via Acappella (10) that define the steps of Knowledge Architecture. The capture (80) of structured content occurs entirely within the domain of the Acappella Designer (100). Capture requires mapping (20) the purpose and structured content (topics, questions, and end-product) of the eventual Specialized Software Application (200). The structured content is input (30) through a structured content capture interface and permanently stored (40) within a data structure that is within the domain of the Acappella Designer (100).

Bridging capture (80) and usage (90), the structured content must undergo preparation (50) by a process that is contained within the Acappella Designer (100). After preparation (50) the structured content is in a format that is accessible within an SSA (200). Within the SSA, there is a standard format for presentation (60) through an interface that makes the structured content (expert knowledge) available and accessible to an SSA user. Interaction (70) occurs when the SSA user navigates through the topic hierarchy to answer questions that are relevant to the situation under consideration. Upon answering the questions, the result is permanently saved but can be modified at a later time. Usage (90) often results in the communication (75) of results, be it the information carried by the answers to the questions or a document generated by the SSA (200), that is used to support the ongoing activities of the SSA user.

FIG. 2 further indicates that the SSA (200) is a complete software entity that does not require the Acappella Designer (100) to run, even though the Acappella Designer (100) was used to build the SSA (200).

Figure 3:
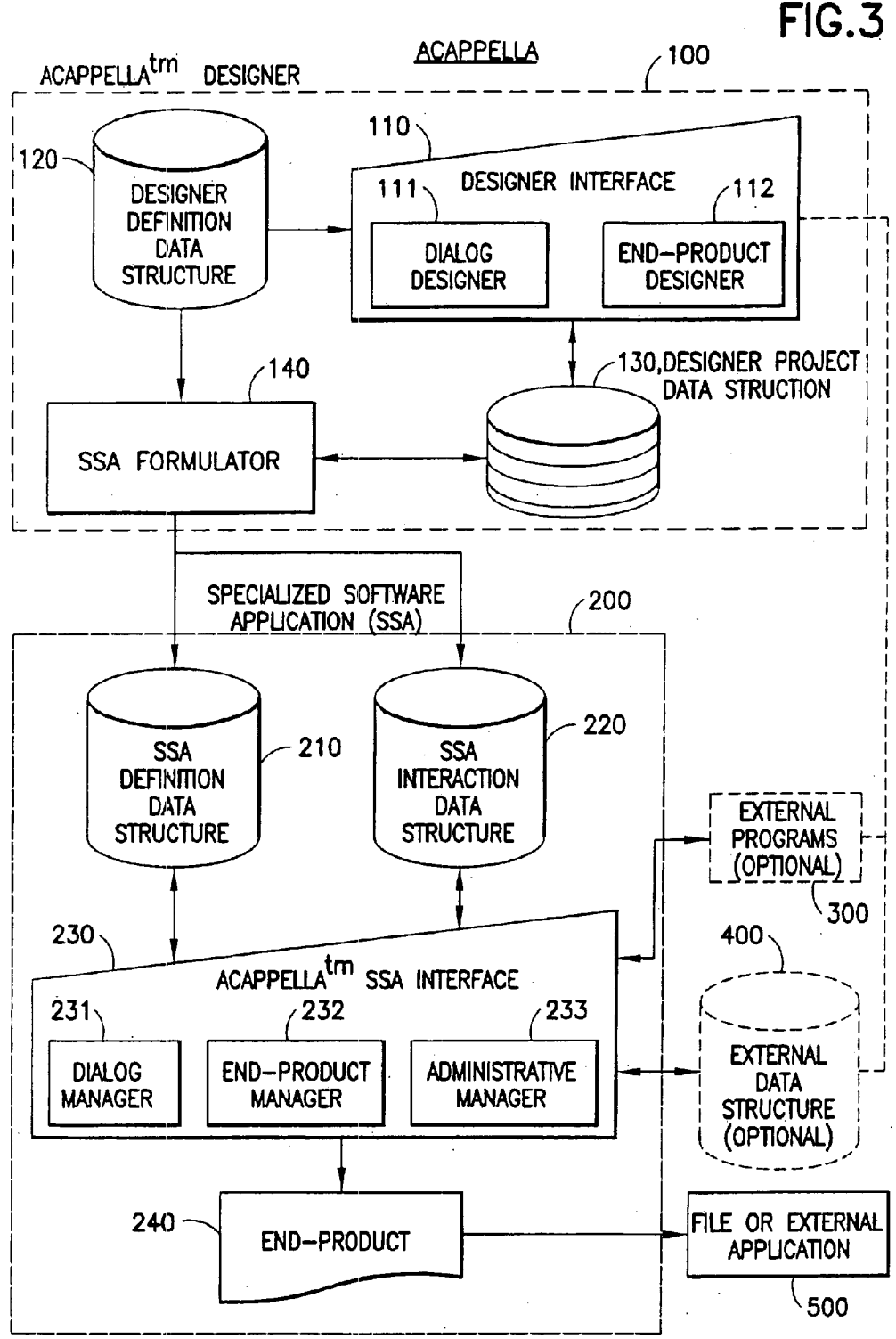
FIG. 3 is a flow diagram representing a detailed description of the creation of a specialized software application according to the system and method of the invention.

A detailed description of the creation of a SSA (200) according to the Acappella system and method of the present invention is indicated in FIG. 3.

An expert uses the Acappella Designer (100) to capture and prepare for use the structured content that defines the SSA (200). Through the designer interface (110), the expert inputs the structured content for an SSA. There are two forms of structured content captured by the designer interface (110). The first is the hierarchy of topics and questions that are at the core of the expertise under consideration and is captured via the dialog designer (111). The second form of structured content is captured via the end-product designer (112) and is used to design an end-product, usually a narrative report, that supports the ongoing activities of the SSA user.

Use of the designer interface (110) is controlled by rules that reside as data within the designer definition data structure (120). Many of the objects, properties and methods that the designer interface (110) displays are based on data elements found inside the designer definition data structure (120).

Knowledge input through the designer interface (110) is stored in the designer project data structure (130). The designer project data structure (130) contains the raw, or unprocessed, structured content for at least one SSA. Working with the Acappella Designer (100) requires the opening of at least one designer project data structure (130). Each opened designer project data structure (130) is also known as a project. The open project provides a feedback loop to the expert by displaying the previously captured raw structured content data to the dialog designer (111) and the end-product designer (112). Once displayed, the structured content can be modified. Each project can hold the raw structured content for one or more SSAs.

Use of the Acappella Designer (100) can occur in a networked environment or on a standalone personal computer.

The designer project data structure (130) also stores other information and options about the project, which is necessary for the processing of the raw structured content into a finished SSA (200) format. Upon demand from the expert, the raw structured content for an SSA in the designer project data structure (130) is combined with information residing in the designer definition data structure (120) and prepared for presentation by the SSA formulator (140). Note that an equivalency of function would occur if the designer definition data structure (120) and the designer project data structure (130) were merged into one data structure.

The SSA formulator (140) prepares the content and data underpinnings of the SSA (200). The SSA formulator (140) populates the SSA definition data structure (210) with hierarchical topic tables, question layout and positioning data, and end-product scripting logic. Furthermore, the SSA formulator (140) initializes the SSA interaction data structure (220) and establishes the data infrastructure necessary to hold answers to the questions that the SSA user will provide.

The SSA definition data structure (210) and the SSA interaction data structure (220) are the foundation data structures that drive the SSA (200). Once raw structured content is converted into these two data structures, the Acappella SSA Interface (230) can access the structured content and present it to the SSA user so they can interact with it. Optionally, the Acappella SSA Interface (230) can draw information from an external data source (400) for presentation to and interaction with the SSA user.

The processes that establish the functionality of the Acappella SSA Interface (230) and the manner of structured content access and display of this interface are unique to the present invention. Structured content begins with presentation in the form of a series of topics and associated questions that are to be answered by the user. The interaction with the topics and questions is handled by a component of the Acappella SSA Interface (230) known as the dialog manager (231). The dialog manager (231) draws information about the SSA content from the SSA definition data structure (210) and presents it to the SSA user as a topic hierarchy and questions. The dialog manager (231) then handles the dialog related action requests from the SSA user, insuring that the SSA interaction data structure (220) is updated with the answers to questions as provided or modified by the SSA user.

Following from the answers to the questions, the SSA user makes a request for an end-product (240) through the end-product manager (232). An end-product (240) often takes the form of a report, usually narrative, but can be an e-mail or other form of document and can include graphs and charts. The end-product manager (232) generates the end-product (240) by initiating a process that works its way through the end-product script. This is a script that had been created with the end-product designer (112) and processed into the SSA definition data structure (210) by the SSA formulator (140). At each required point in the end-product script, the end-product manager (232) refers to the answers stored in the SSA interaction data structure (220) and pulls together and/or sets the appropriate text, graphic, and charting elements to complete the generation of the end-product (240). The end-product (240) is saved into an external file (500) and/or launched into an external application (500) such as a word-processor so the end-product can be modified. The SSA user can distribute an end-product (240) to third parties.

Throughout this process, there are other components managed via the Acappella SSA Interface (230) that control other functions of the SSA such as security, a notes facility, archive, import and export etc. The components of the Acappella SSA are peripheral to the content and are strictly there to enhance the functionality of the SSA so that it meets the requirements of everyday use required by the SSA user. The SSA (200) can also incorporate external software programs (300) or modules to handle or manage functions that fall out of the scope of the SSA (200). External software programs (300) and data structures (400) must be initially declared to the SSA via the designer interface (110) so they can be recognized within the finalized SSA (200).

Although an SSA (200) incorporates the Acappella SSA Interface (230), it does not require the Acappella Designer (100) to be present or available in order to function. Once completed, the SSA (200) stands apart as an entity and can be used by the expert who designed it or distributed to users who have access to a computer, all without having to also distribute the Acappella Designer (100).

The detailed description of the creation of an SSA encompassed in the flow chart comprising FIG. 3 have corresponding relationships to the steps of the flow charts indicated in FIG. 1 and FIG. 2 as follows. FIG. 2 and FIG. 3 in their entirety are the present invention of Knowledge Architecture and Acappella respectively and are indicated in FIG. 1 as Acappella (10).

All three Figures refer to the Acappella Designer (100) and the resulting SSA (200). The designer interface (110) of FIG. 3 corresponds to the mapping (20) referred to in FIG. 2. FIG. 3 further indicates the components of the Acappella Designer (110) known as the dialog designer (111) and end-product designer (112). As noted in FIG. 2, these two components are the interface through which the expert inputs (30) structured content. The storage (40) facility noted in FIG. 2 corresponds to the designer project data structure (130) indicated in FIG. 3.

The SSA formulator (140) of FIG. 3 corresponds to the preparation (50) step in FIG. 2. Preparation (50) consists of the creation of the two foundation data structures of the SSA (200). The first, as noted in FIG. 3, is the SSA definition data structure (210) that contains the formulated structured content. When the Acappella SSA Interface (230) of FIG. 3 and FIG. 1 is opened, it accesses the information within the definition data structure (210) and displays it. This event corresponds to the FIG. 2 presentation (60) of structured content.

It is the components of the Acappella SSA Interface (230), components such as the dialog manager (231), end-product manager (232), and administrative manager (233) that handle the interaction (70) with the SSA user as discussed in FIG. 2. The manager components pass information back and forth with the SSA interaction data structure (220), and when called upon, store the information that the SSA user provides during interaction (70) with the SSA (200).

Finally, upon request by the SSA user, the end-product manager (232) of FIG. 3, which is part of the Acappella SSA Interface (230), processes through the end-product script, which is stored in the SSA definition data structure (210). As the end-product manager (232) processes through the end-product script, it uses the information provided by the SSA user and stored in the SSA interaction data structure (220) to determine which logical paths to proceed through to produce the end-product (240). Communication (75) as indicated in FIG. 2 encompasses the end-product (240) referred to in FIG. 3.

A more detailed descriptive example of the processes, represented by FIGS. 4 through 21, within the flow chart indicated in FIG. 3 now follows.

Figure 4:
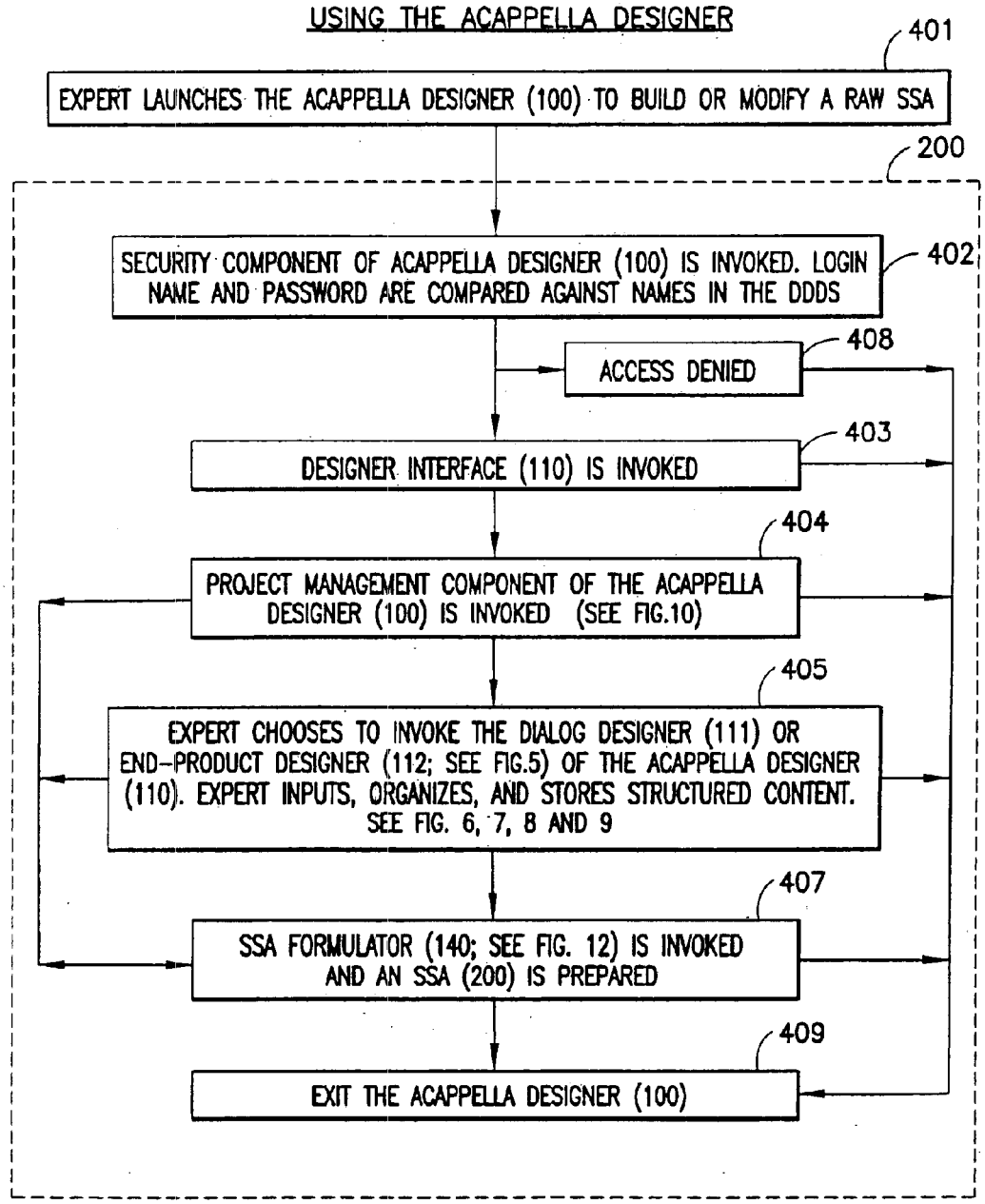
FIG. 4 is a flow diagram representing a detailed description of the creation or modification of a specialized software application according to the system and method of the invention.

When an expert launches (401) the Acappella program, he is opening the Acappella Designer (100), as represented within FIG. 4. When this request is made, the Acappella Designer (100) launches (402) a security layer that either identifies the expert from the operating system login or requests the expert identify himself directly to the system. Once the expert is identified, he gains access (403) to the Acappella Designer (100) and an open project window appears (404) which is the interface to the project management component of the Acappella Designer (100) detailed in FIG. 10. As previously defined, a project is the term used to indicate a designer project data structure (130) that contains the raw, or unprocessed, structured content for at least one SSA. If there is more than one SSA in a project, then the content of each SSA is standardized and tightly integrated. The open project window (1001) requires the expert to either start a new project (1002) or continue working with an existing project (1003). To create a new project, the expert is asked to provide a name for the new project (1010). When the request is confirmed, the Acappella Designer (100) proceeds to create and initialize (1011) a new designer project data structure (130).

A new project requires the expert to initiate the process for adding a new SSA to the project (1021). The expert is asked to provide a unique name (1022) for the new SSA. Once this name is provided and confirmed as unique, records are created (1023, 1024) in the designer project data structure (130) keyed on a new unique identifying number (UIN) for the SSA. The new UIN and the data in the designer project data structure (130) for this new SSA is retrieved and held in memory (1007) to indicate the currently active SSA. The expert then proceeds to work with the SSA, FIG. 5, as if it is an existing SSA.

To work with an existing project, the expert selects from a list of projects (1003) in locations known to the Acappella Designer (100). The new or existing project is then opened into the designer interface (110) where the Acappella Designer (100) accesses the designer definition data structure (120) to retrieve and display (1004) the names of the SSAs within the project. The expert chooses whether they want to work within an existing (1005) SSA or create a new (1021) SSA. If they select an existing (1006) SSA, then the identifying elements of that SSA, such as a unique identifying number (UIN), are retained (1007) to indicate the currently active SSA.

Figure 5:
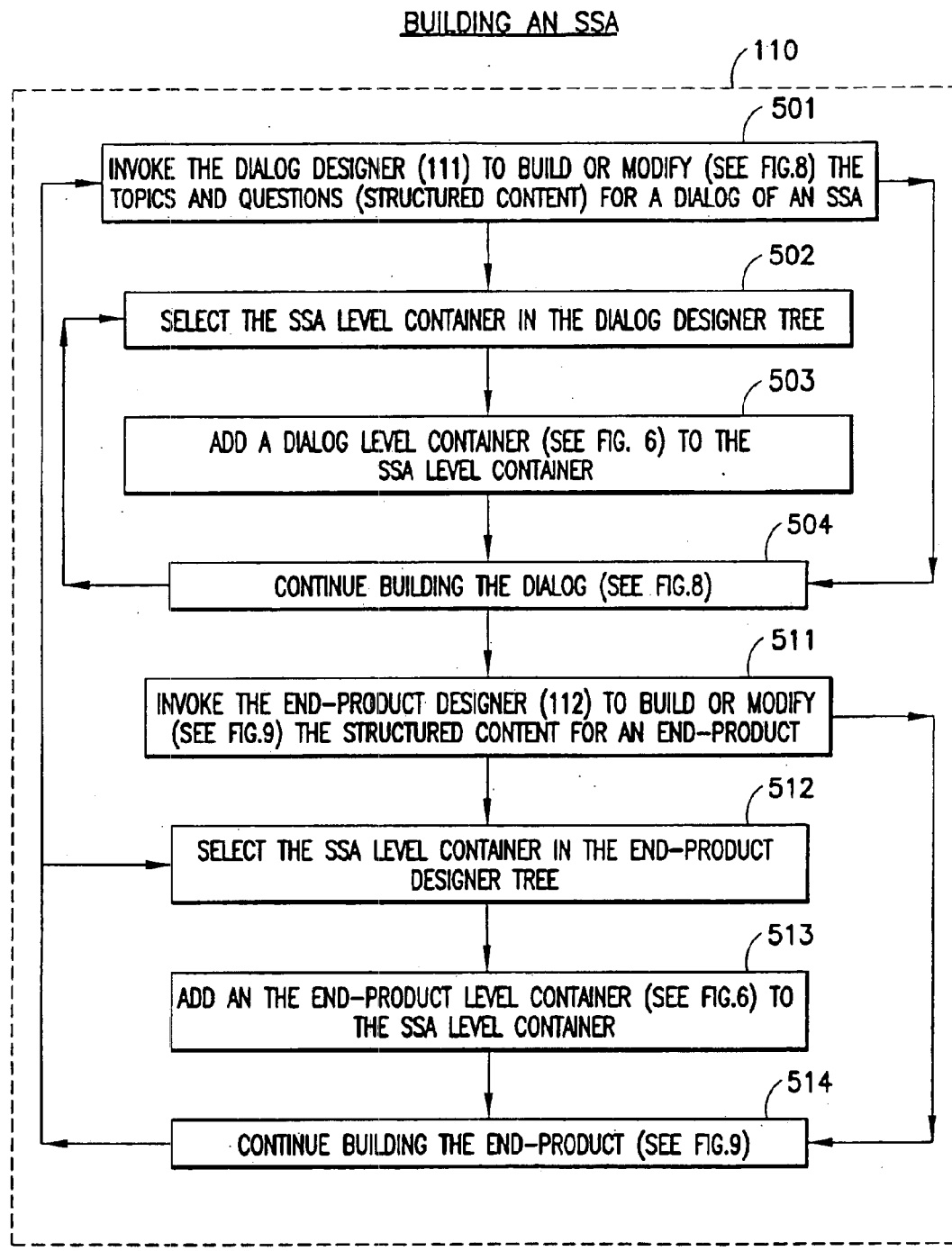
FIG. 5 is a flow diagram representing the process of building a specialized software application according to the system and method of the invention.
Figure 6B:
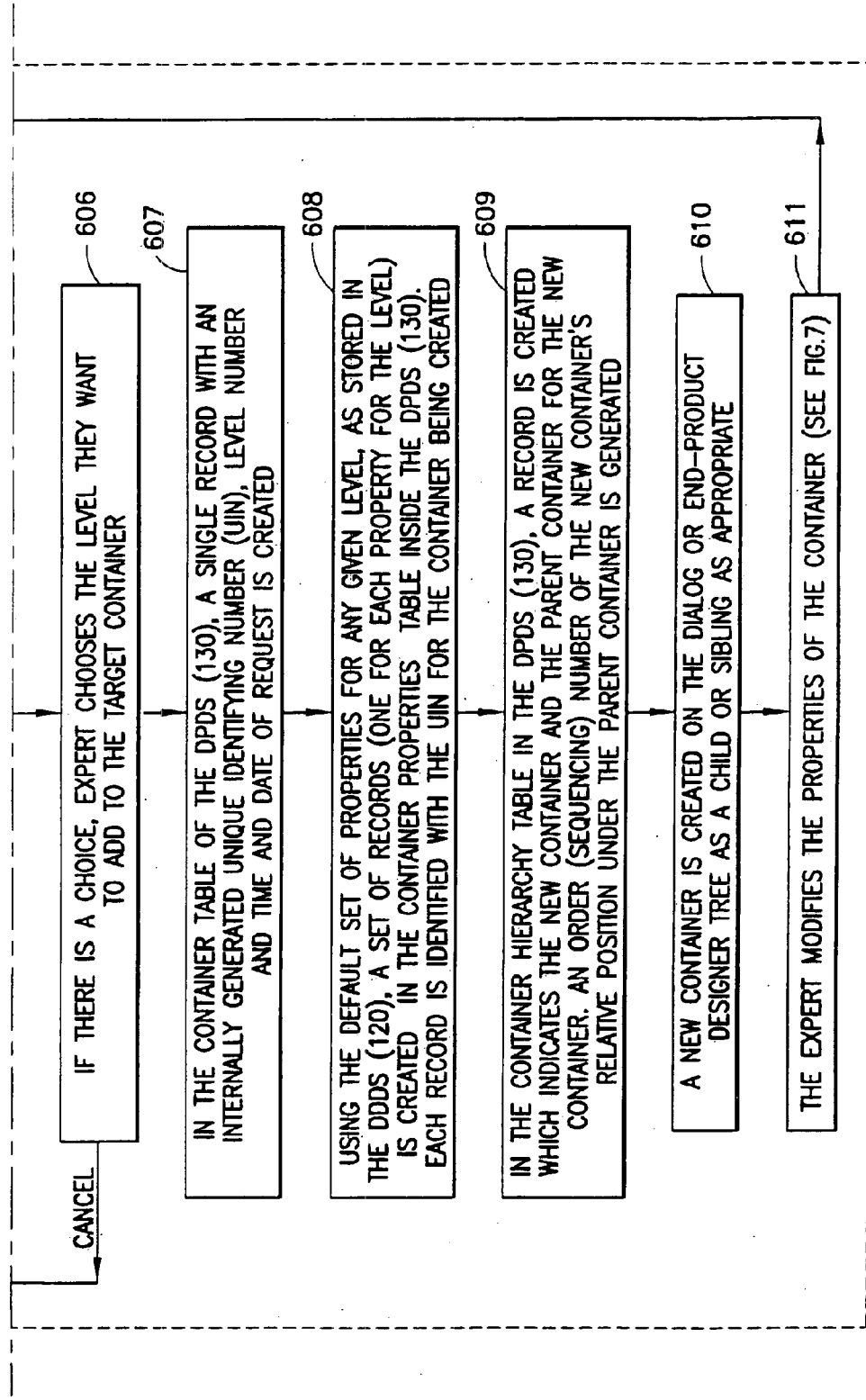
FIG. 6 is a flow diagram describing the process of adding a container to a specialized software application according to the system and method of the invention.
Figure 7B:
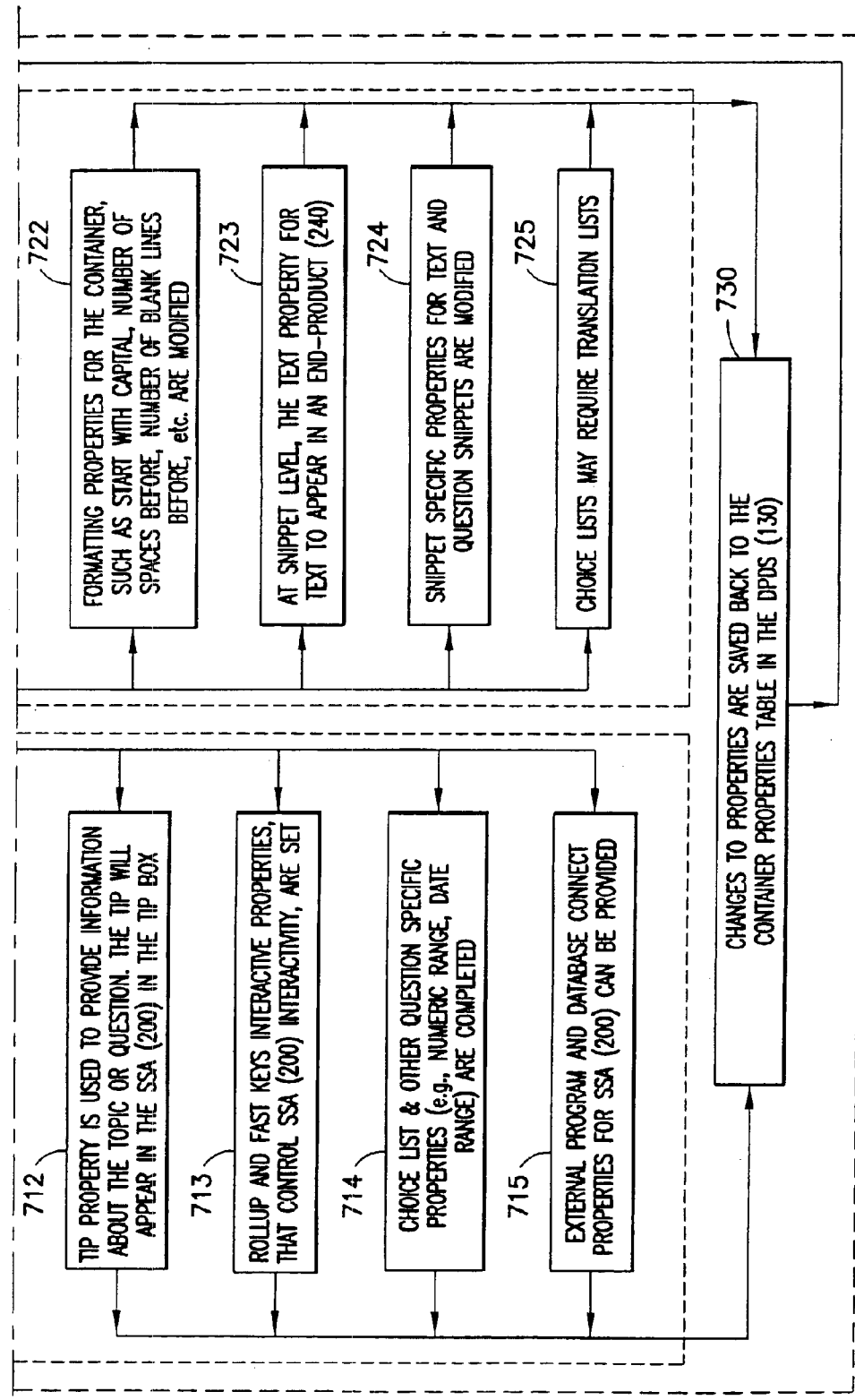
FIG. 7 is a flow diagram describing the process of modifying a container within a specialized software application according to the system and method of the invention.

Building an SSA, FIG. 5, requires working with the two forms of raw structured content: dialog (504) and end-product (514). Only through the designer interface (110) can raw structured content be added as represented in FIG. 6 or modified as represented in FIG. 7.

Figure 8A:
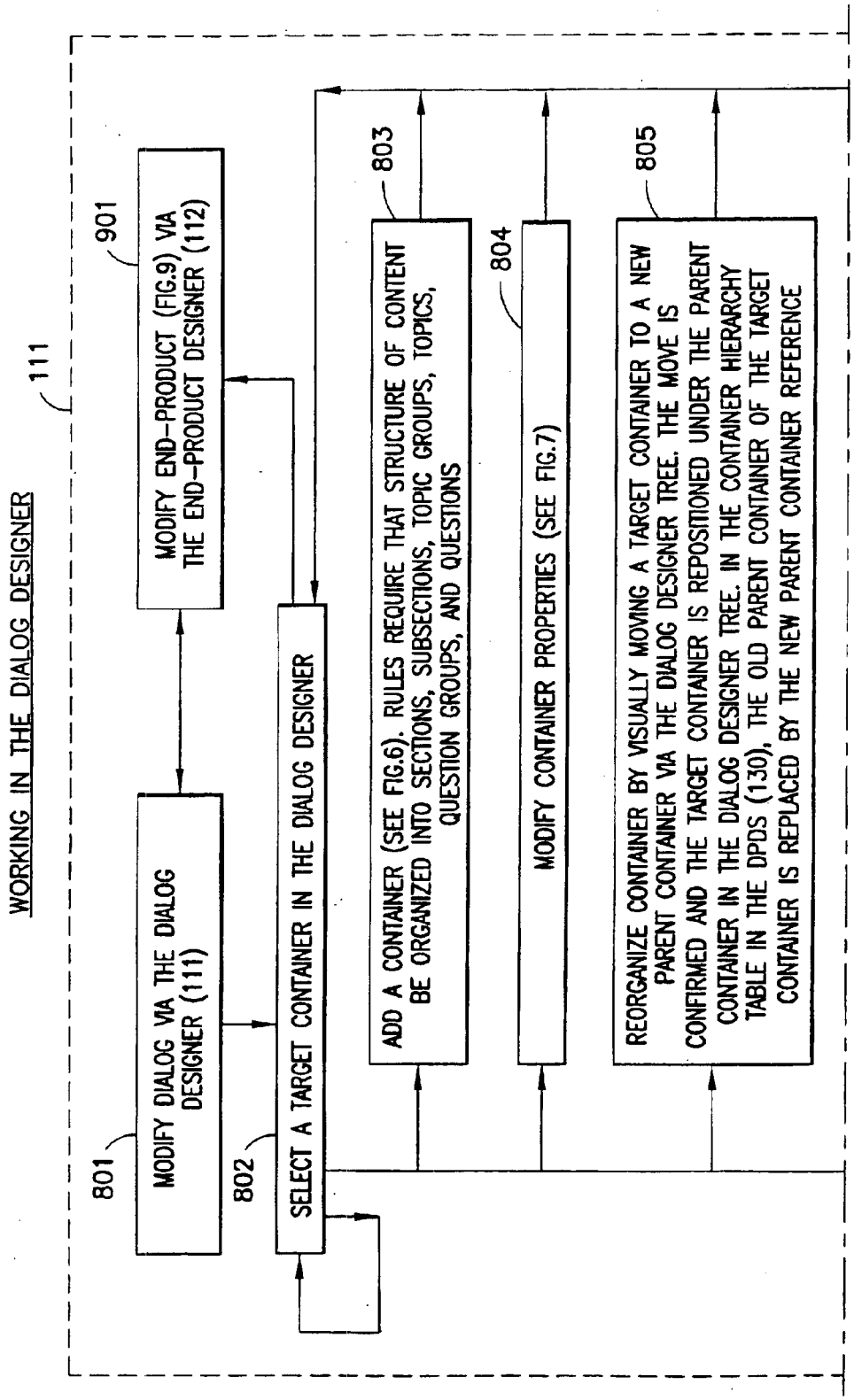
FIG. 8 is a flow diagram representing the method of utilizing the dialog designer (111) according to the system and method of the invention.
Figures 8, 8B:
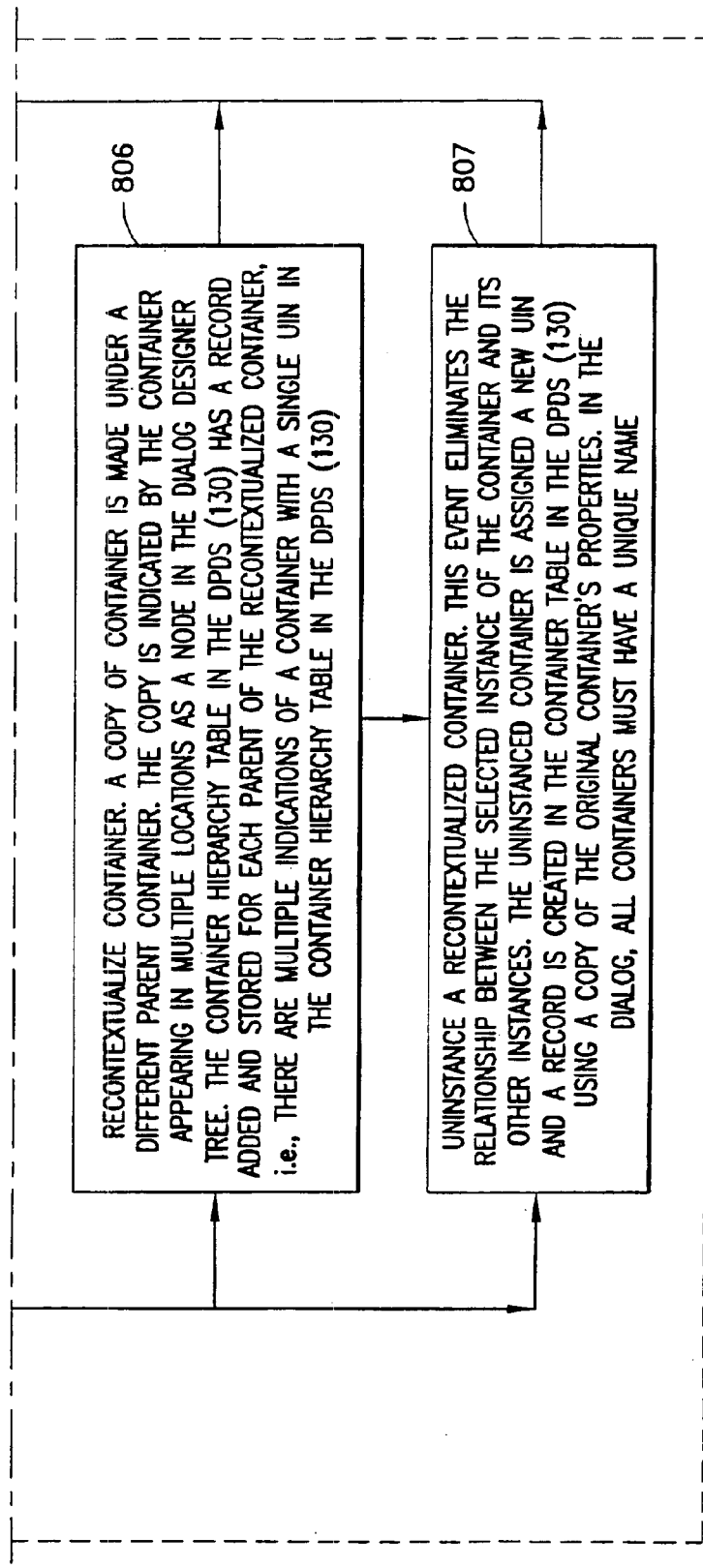

Dialog structured content is a hierarchy of topics and associated questions. The dialog form of structured content is designed via the dialog designer (111) as represented in FIG. 8. The topic hierarchy is organized into increasingly detailed levels that include sections, subsections, topic groups, topics, and question groups (803). At the question level, questions take the form of true/false, yes/no, multiple-choice, date, time, text, numeric response, etc. Information about each of these levels are captured as raw material via the dialog designer (111) within the designer interface (110) and stored in the designer project data structure (130).

Figure 9A:
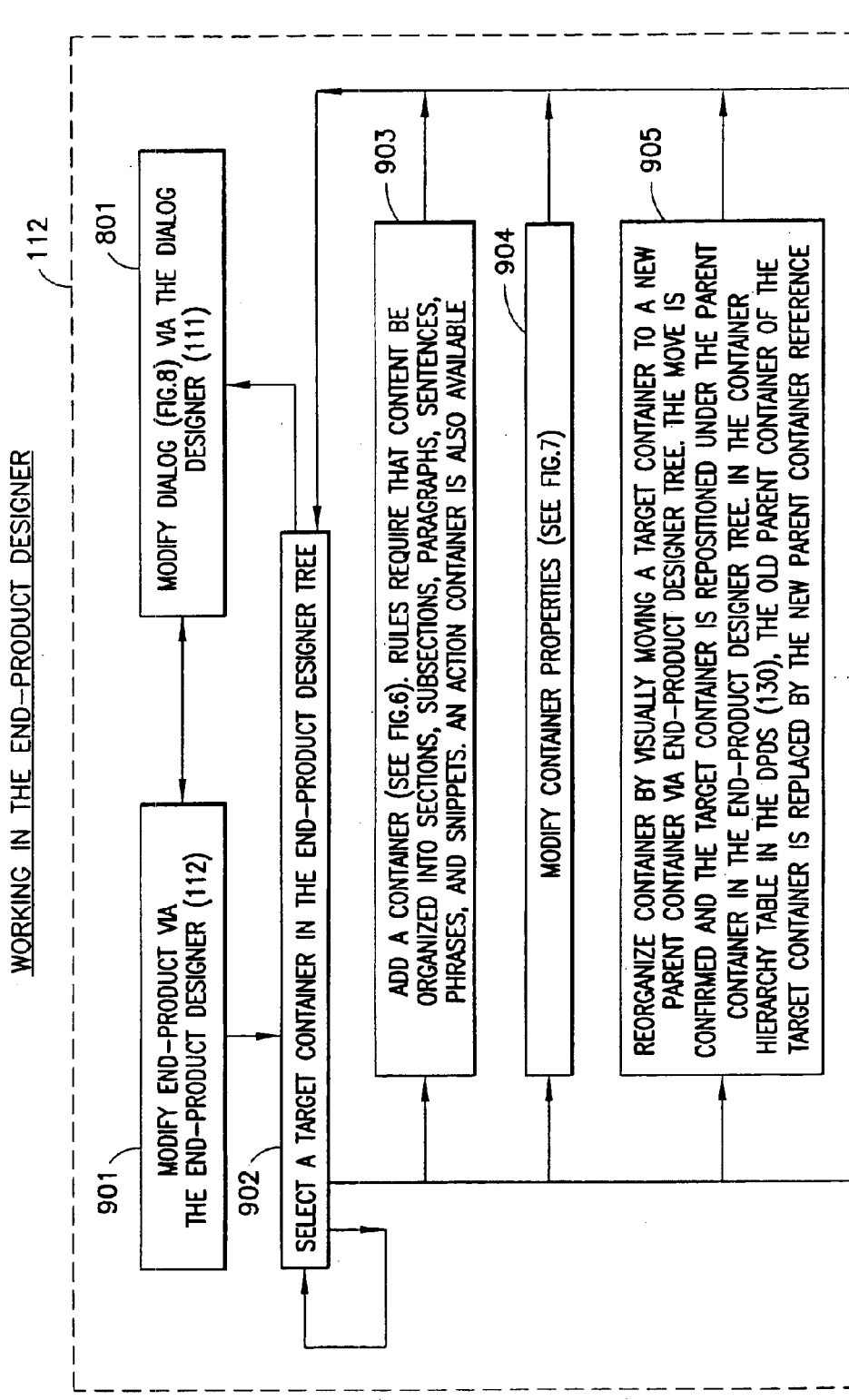
FIG. 9 is a flow diagram representing the method of utilizing the end-product designer (112) according to the system and method of the invention.
Figures 9, 9B:
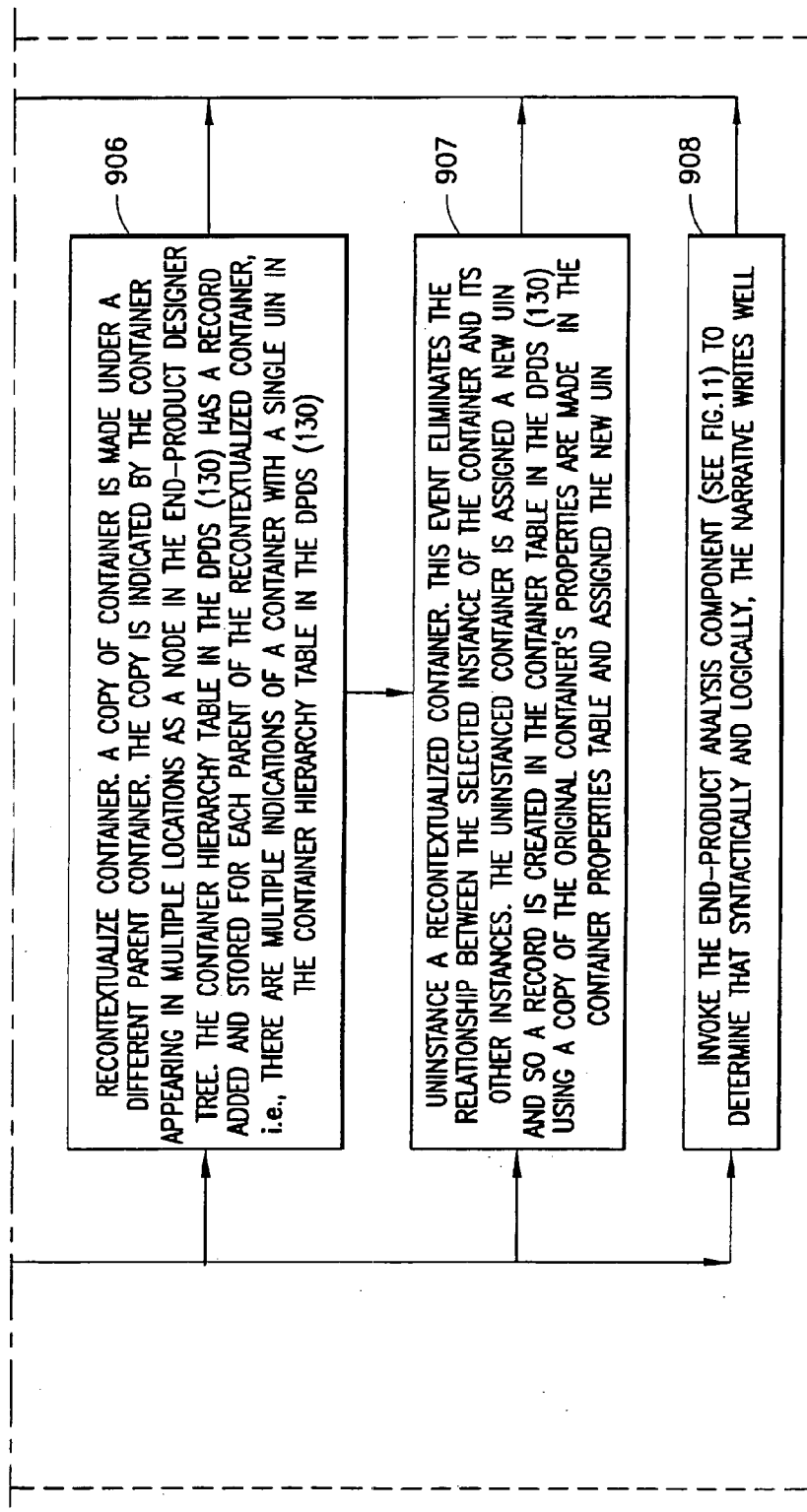
Figure 10:
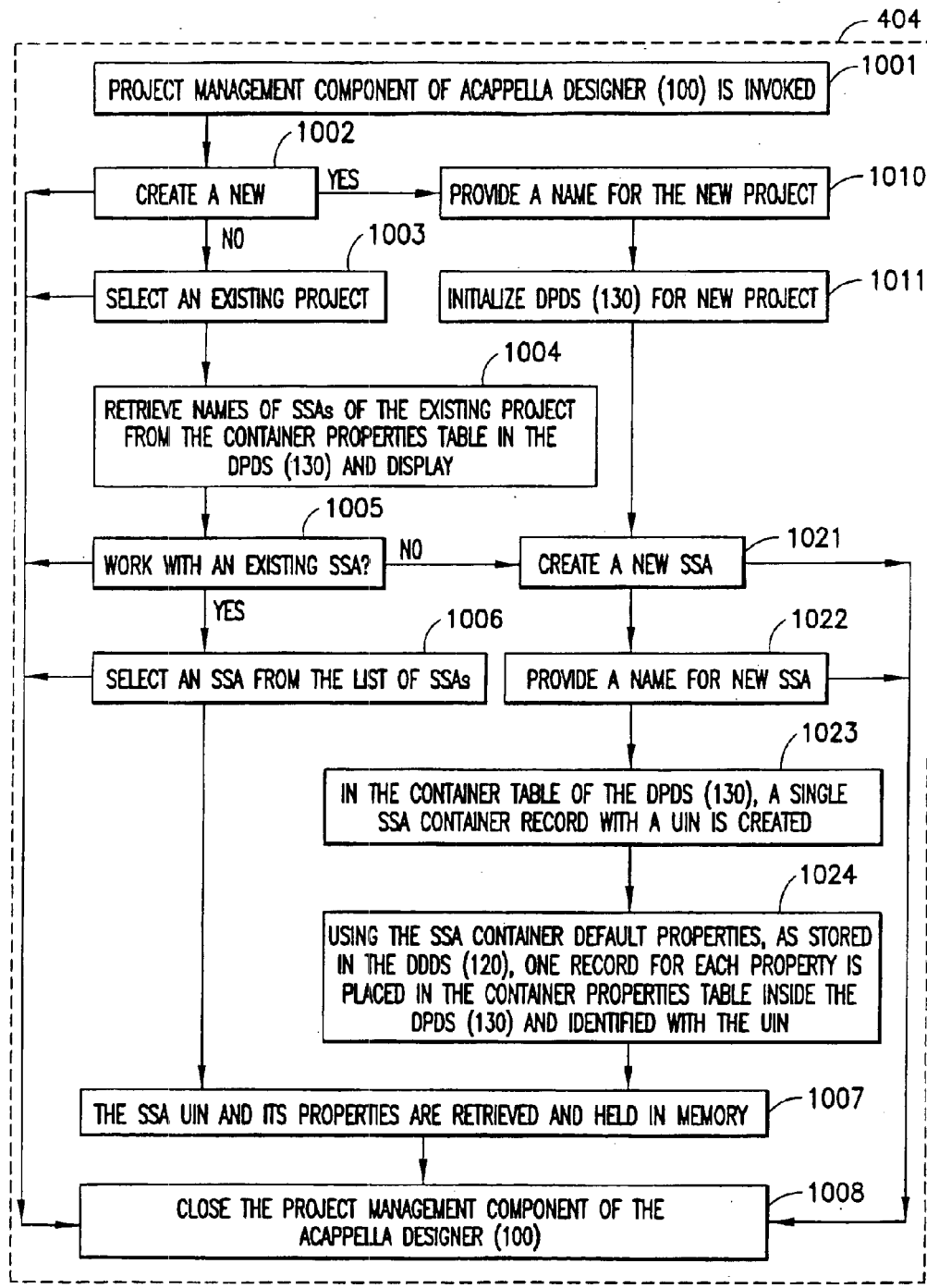
FIG. 10 is a flow diagram representing the project management component of the acappella designer according to the system and method of the invention.

The end-product form of structured content is designed via the end-product designer (112) as represented by FIG. 9. End-product structured content is comprised of a script the expert has provided that must be followed to generate an end-product from the SSA. The script can include graphical or chart elements. Guided by the methodology of the end-product designer (112), the narrative portion of the script is broken into hierarchically organized levels such as sections, subsections, paragraphs, sentences, and phrases (903). The final level, the snippet, is the level at which text is generated and output. All the higher levels pull text together to build up the end-product.

Information about each of these levels is captured as raw material via the end-product designer (112) within the designer interface (110) and stored in the designer project data structure (130).

An SSA opened into the designer interface (110) contains the raw structured content for multiple dialogs and end-products. The expert chooses (405) whether they want to open the dialog designer (111) or end-product designer (112). The expert can toggle between the two designer entities at any time during the design process.

The levels that comprise the hierarchies of both the dialog and end-product are the raw material of the SSA. The expert uniquely names each level in the dialog (710) and is free to name, 721). This name is stored as a data element (730) within the designer project data structure (130). Besides the name, there are other data elements, referred to as properties (710–715, 720–725) associated and stored with each level. There are properties that control features of display within the SSA (200) such as a caption (710) by which the SSA user can refer to the level (if different from the unique name). Some properties determine aspects of behavior (711) of the level within the SSA (200) such as whether the level should be enabled (responsive to SSA user events). Other properties control the processing to be conducted by the SSA formulator (140), such as whether the level should be processed from raw material into SSA content. Other properties carry information that is indirectly changed by the expert through the graphical capabilities of the designer interface (110) such as which container is the parent of the current container. And finally, the expert cannot change some properties since they hold UINs or other features that have been generated internally by the Acappella Designer (100).

Each level has its own set of properties and it is the collection of properties that uniquely identify the level. A level, as defined by its properties, is referred to as a Container. The properties that define each container and level are stored and retrieved from the designer definition data structure (120).

The container information is held in three separate tables; a table that holds properties that are common across all containers (container table), a table that holds properties that are unique to each container level (container properties table), and a table that holds information about the relationships between containers (container hierarchy table). Both the dialog and end-product have their own versions of each of these tables.

Container information from the three dialog tables in the designer project data structure (130) is used to populate the dialog designer (111). The dialog designer (111) incorporates a dialog designer tree that displays the hierarchical relationships between the levels of the dialog for the SSA. With a new SSA, only the topmost levels exist and are visible. These topmost containers indicate the name of the SSA and the name of the dialog. If the SSA were further along in development, the expert could open a container to reveal the containers that are subordinate or children to the selected level. The container that was originally opened is considered a parent to the subordinate containers.

In the dialog, containers currently have seven level types include dialog, section, subsection, topic group, topic group, topics, question groups, and question. Each successive level in this list is a child of the level that precedes it. However, topics can also be a child of any level through the section while questions can be a child level to topics or question groups. Questions are the lowest container level in the dialog. The rules governing the hierarchical relationships between containers (603) are held within a single data table in the designer definition data structure (120). Each time a level is added (803), copied (806), or moved (805), the hierarchical rules table is consulted to see K, prior to completion of the action, what type of level can be subordinated to or parent of the target level.

Adding a container, FIG. 7, to the dialog designer tree (503), which adds a level to the raw structured content that comprises this SSA, requires the initiation of an add (803) child (subordinate) or sibling (peer or equal) process against a target container (802). Upon initiation of this process, the current level is processed against the rules of the hierarchical rules table to determine which level(s) can be added as a child or sibling (603). The user can then select from the allowable levels to add a container (606). Upon selection by the expert, two events occur. First, the appropriate container records, keyed on a UIN, are created in the three dialog tables of the designer project data structure (130). A single record is therefore created in the container table (607), a single record is created in the container hierarchy table (609) that indicates the parent/child relationship of the container to the target container, and multiple records in the container properties table (608). The multiple records of the container properties table are populated with default values (608) that reside in the designer definition data structure (120). Second, following the creation of the container in the designer project data structure (130), a new node on the dialog designer tree is created (610). The newly added container information is retrieved from the designer project data structure (130) and is displayed to the expert via the dialog designer (111) where it can be modified (611) by the expert.

Should the expert select (701) a currently existing container, the container information is likewise retrieved (702) from the designer project data structure (130) and is displayed within the dialog designer (111). Once displayed, the expert can modify any property that is displayed (703). After being changed, the designer project data structure (130) is updated with the new property values (730). If the expert chooses to modify the name of the container (710), or any other property that is visually represented on the dialog designer tree, then the dialog designer tree is automatically updated at the same time as the designer project data structure (130) to reflect the change.

As previously noted, container properties control features of display within the SSA (200). The "tip" property is one such property (712). The expert uses the tip property to explain the context or purpose of the container. So as the expert adds a container, he supplies an explanation that is relevant to the container that will be displayed to the SSA user as the SSA (200) is navigated.

There is another display property that is unique to the multiple choice, or pick from a list type of question. This property is referred to as the "choice list" property (714). The choice list property (714) refers to a named list of items that will act as the possible set of answers to the multiple-choice or pick from list type of question. For instance, a choice list named "Basic Yes/No" might include as its items the values of Not Applicable, Yes, and No. The named list and its items are stored in a choice list table in the designer project data structure (130). When the choice list property (714) is accessed, the expert either picks a named choice list from the existing set of named lists or creates a new named list. A new named list is then populated with list items. The SSA formulator (140) prepares the choice list table for presentation (140) within the SSA (200). Within the SSA (200), the dialog manager (231) refers to the named choice list in order to populate the answers to the question that the SSA user will choose from.

Properties that control the behavior of the SSA (200) are also declared within the dialog designer (111). For instance, there is a mathematical process that occurs as the SSA (200) is used referred to as Rollup (713). Rollup is a process handled by the dialog manager (231) that takes advantage of the hierarchical relationship between containers, represented by FIG. 19. Rollup begins with the premise that each container in the hierarchy is well served to have information on the activity of the containers that are subordinate to it (1903). With this goal in mind, each time questions in a topic are answered such that they deviate from the default answer (1905), a chain reaction event is set off. For every question that is answered, its parent has a data element that is set to true (1907) if that parents rollup flag is set to true (1904). The parent of the parent that was just set to true (grandparent of the question) is then processed to confirm if any of its subordinates were set to true. Given that one of them is true, then the grandparent is set to true. This series of events works its way up the hierarchy as far as is necessary to set the subsequent parent events to true (1908).

The result is an inverse propagation event that carries information from the bottom of the hierarchy (the questions) all the way to the top. Thus the event is named rollup. The current iteration of the invention will set all parent containers to true if an answer is placed within any child container. A currently planned release of the invention will begin to quantify these events, supplementing the true flag with a numeric value (e.g, 1, 2, 3, etc.) and carry numeric propagation up through the hierarchy.

This introductory discussion is entered here (detailed discussion occurs when discussing the dialog manager (231) below) because the rollup event is controlled by a property that is set within the dialog designer (111). The rollup property is an on/off switch that determines whether the rollup event should continue to propagate to the parent above the current container (1904). The SSA formulator (140) passes the rollup property value along to the SSA definition data structure (210). This flag determines the behavior of the rollup event for any given container when the SSA (200) is in use.

Containers, and their position in the hierarchy as represented in the dialog designer tree, can be moved (805, 905) or duplicated (806, 906) within the dialog designer tree. Duplication of a container means that the container appears in more than one position in the dialog designer tree. Moving or copying an item only requires that the move comply with the rules for container relationships as they exist within the hierarchical rules table. A move or copy is usually performed via the drag-and-drop functionality that is provided by the computer operating system. There are also keyboard or other equivalents that replicate this functionality.

Each replica of a container is referred to as an instance. An instance of a container includes not only the container itself, but any corresponding children. Visually, or in the display, an instance appears as many times as it is replicated. Any changes to one instance of a container are immediately reflected in the other instances of a container. Within the designer project data structure (130), each instance corresponds to a record in the container hierarchy table, however the common container properties and container unique properties tables maintain only a single source reference to the container. That is, there is not a corresponding duplication of the container record in two of the three tables in the designer project data structure (130).

For the expert, instancing allows for containers, and most importantly questions, to appear in multiple contexts, i.e., a given container can be subordinate to multiple parents. Once translated into the finished SSA (200), the container will appear in two locations. If the container is a question, answering the question once means that value is stored. The next time the question is displayed, regardless of whether the SSA user is now accessing the original location where they answered the question, or in a new location where the question appears, the value of the answer is retrieved from the database and the answer as originally provided will be displayed. Therefore answering a question in one instance results in that answer being carried forward into all instances. Of course, the answer can be changed from within any instance and the new answer will appear whenever a subsequent instance is displayed.

From a business process perspective, this carry forward capability results in a concept referred to as recontextualization (806, 906). Via the dialog designer tree, questions and other container levels can be recontextualized (806, 906) so the container can add its information to multiple parent containers without prejudice. Recontextualization (806, 906) thereby adds a multi-dimensional quality to the dialog that more closely reflects the natural thought processes of the expert or the business process of the organization.

For instance, a speech and language pathologist may consider a child's use of facial gestures to be poor relative to the skills of a child's peers. However poor facial gesture use may be meaningful in the context of overall use of language in social situations with poor overall social skills making the issue more serious than if overall social use of language was performed at an appropriate level. In the dialog designer tree, the question of degree of skill in facial gesturing may therefore appear in two contexts; 1) the first context is in a topic on facial gesturing skills; 2) the second context is the overall social use of language, part of which is determined by the skills of facial gesturing.

In another example, a speech and language pathologist may be answering questions on each of the six functional areas of the six functional areas of the assessment (e.g., oral peripheral mechanisms, hearing, phonology, voice, fluency, and language) culminating in an overall severity of problem answer for each of those areas. An administrator may want to begin a review of the client analysis by seeing only the responses to the severity questions in each of the functional areas. Rather than having to go through the SSA to find the answer to each question on severity, the six severity questions can be brought together under one topic allowing the supervisor, to see at a glance, an overview of the severity of the problem across the functional areas. From there, the supervisor can decide whether they want to explore the detail that has led to the particular severity ratings for each functional area. In real-time, the supervisor has the information he needs to make decisions. And recontextualization (806, 906) has allowed the business process to/be mirrored. As the expert builds the structured content of the SSA within the dialog designer (111), recontextualization (806, 906) becomes a powerful tool at his disposal.

Instanced containers can be uninstanced (807, 907) using the capabilities of the designer interface (110). That is, a replica that would act as a recontextualized (806, 906) question can instead be converted into a unique container (807, 907). There is a one-step process that, upon initiation by the expert, gives the new container a unique identifying number in the three dialog container tables in the designer project data structure (130). The process updates the container hierarchy table with the new unique identifying number, creates a record in the common container property table for the new container, and copies the values for all the properties of the original instanced container into the values of the new container. All linkages that existed due to instancing are thereby broken and cannot be recovered and the recontextualization (806, 906) factor is no longer being utilized.

Fundamentally, the end-product designer (112) shares many functional features, represented by FIG. 9, with the dialog designer (111). There is an end-product designer tree that displays the hierarchy of relationships between containers. The relationships between the containers are governed by rules (603) that exist in the hierarchy rules table in the designer definition data structure (120). Each container level has a unique set of properties, some of which can be changed by the expert (720–725). There are three end-product tables in the designer project data structure (130) that hold all the information about an end-product container and populate the display that is the end-product designer (112). The set of end-product containers is the structured content that comprises the raw material of the end-product (240) for an SSA (200). A container can be added (903), moved (905), or duplicated (906) on the end-product tree based on rules within the hierarchy rules table. Duplication of a container produces an instance of the container.

The end-product designer (112) however, is used to design a script that will generate an end-product (240) from within an SSA upon request from an SSA user. Via the end-product designer (112), an end-product script is designed that acts as the path to be followed during end-product (240) generation.

A script is built from a series of model document comprised of model narrative sentences that the expert conceptually creates. The model document is used to build the end-product hierarchy while the model narrative sentences are broken into their composite parts, i.e. into phrases and snippets that need to be brought together to form a sentence. Everything is then input into the end-product designer (112).

As such, the script is a hierarchical path that, in its visual display, is similar to the hierarchy of the dialog designer tree. However, the end-product designer tree is comprised of levels such as end-product, section, subsection, paragraph, sentence, phrase, and snippet (903). There is also one special container referred to as an action container (903). All but the snippet levels are grouping and categorizing levels that structure the end-product (240) and assemble or gather the words (or other display elements if charts and graphs are being generated) carried by the containers that are subordinate to it.

The snippet level is the "written word", that is the actual text or display element which is passed into the script during end-product generation. There are two types of snippets: 1) snippets that are literal text to be used in sentence assembly; 2) snippets whose text is dependent on the answers to questions the SSA user has provided.

In the case of type 2 above, some questions rely on the choice list for their answers. If so, then the text that is inserted into the end-product is not likely to be a direct insert of the chosen answer. Instead, the answer requires a translation into the text (724) that will be used in the end-product.

To accomplish this, the expert creates a translation list for the choice list. A translation list is a corresponding series of text replacements, or translations, for each answer in the original choice list. Based on the answer to a question, i.e. based on the selected choice list item, the appropriate text replacement is passed to the end-product generation process. This translation list capability is not restricted to simple replacements. The insertion text can be as sophisticated as necessary to accommodate a syntactically correct resulting sentence. A translation list can therefore be quite long and sophisticated itself. In many cases, a choice list has only one translation list. However, there can be multiple translation lists for any one given choice list. Each translation list is identified by a name. When the end-product (240) is generated, the named translation list for the choice list is identified as part of the script, the appropriate replacement is accessed, and the designated text insertion is retrieved. That retrieved text is the snippet that is used in the assembly of the sentence.

Phrases are intermediary steps within sentences that assemble and/or format the snippets that are subordinate to them. Phrases can also be subordinate to other phrases. Sentences assemble and format the phrases and snippets that are subordinate to them then combine to produce paragraphs. Similarly, paragraphs are the main components of sections and/or subsections.

The action container is an organizing level that has no direct parent and no specific subordinate. Action containers can be used as a parent to sections, subsections, paragraphs, or sentences and is therefore a child to end-product containers, sections, subsections, and paragraphs. This unbound quality of the action container results in the mimicking of the grouping capability of the container that is its parent. So action containers are a free-form container used to group sections, subsections, paragraphs, and sentences.

For instance, assume that a group of four topics, and their subsequent answers, are scripted to produce a total of twelve sentences (three sentences are scripted from each topic). These twelve sentences, regardless of how many of them are ultimately generated by the user of the SSA, need to be grouped together to form a single paragraph. The efficient route for generating this paragraph is to group the twelve sentences into four groups of three, reflective of the fact that the paragraph is comprised of the four topics, each topic leads to the scripting of three sentences. The grouping of the sentences into threes is accomplished via the action container, which acts as a grouping intermediary between the paragraph and these sentences. Under the one paragraph then, the hierarchy would indicate four action containers. Within each of the four action containers would be three sentences (making the total of twelve sentences). Each action container corresponds to a topic. Each sentence is based on the answers to specific questions within the topic. Using this methodology, the hierarchy gains an important layer of flexibility that simplifies, and makes more efficient, the end-product script.

The key to processing through the hierarchy is the presence, at every level except for the snippet, a condition property (720) that is used to indicate the circumstance under which that level and its subordinates should be processed. The circumstance, or condition, is tied back to the answers that the SSA user has provided. For instance, a condition may be based on whether an answer has been checked as true or whether the rollup for a dialog container has been flagged as true. Note that this hierarchical scripting process takes extensive advantage of the rollup capability within the SSA as discussed previously. Or the condition may hinge on whether a particular choice is made in a question that uses a choice list. Date, time, and text entry questions need to be checked for the presence of any value indicating an answer has been provided. Numeric answers may require a check to see if a particular value has been provided. The end-product designer (112) has a facility that allows these and other types of conditional checks to be built quickly and without requiring a need to understand programming languages. When the SSA user requests that an end-product (240) be generated, then the conditions refer to the answers held in the SSA interaction data structure (220) to process through the conditions in the hierarchical script.

Every level has further properties that can be used to format (722), or prepare the text that it assembles, for display in the end-product (240). For instance, a sentence is visually distinguished by the period or other punctuation at the end of it and a capital letter and a space or two in front of it. Sentences therefore, have properties that include ending punctuation, capitalization of the initial letter in the sentence, and the number of spaces it should have in front of it. Paragraphs are identified by the double spacing that precedes it or the indenting in front of it. Sections and subsections usually begin with headings. These display features of each container level have been converted into properties that are controlled by the expert.

Figures 11, 11A:
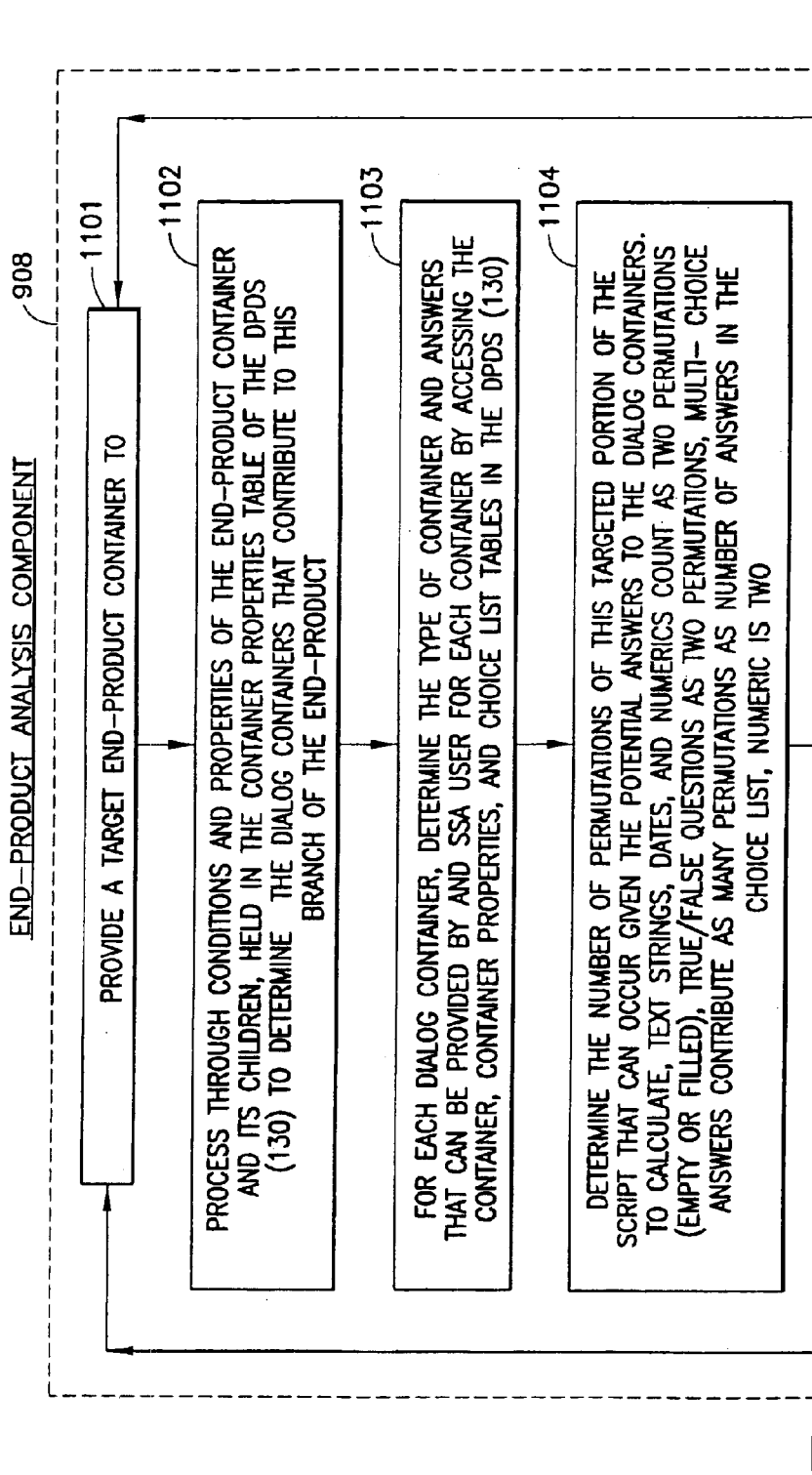
FIG. 11 is a flow diagram representing the method of analyzing, reviewing, and modifying the end-product design according to the system and method of the invention.
Figure 11B:
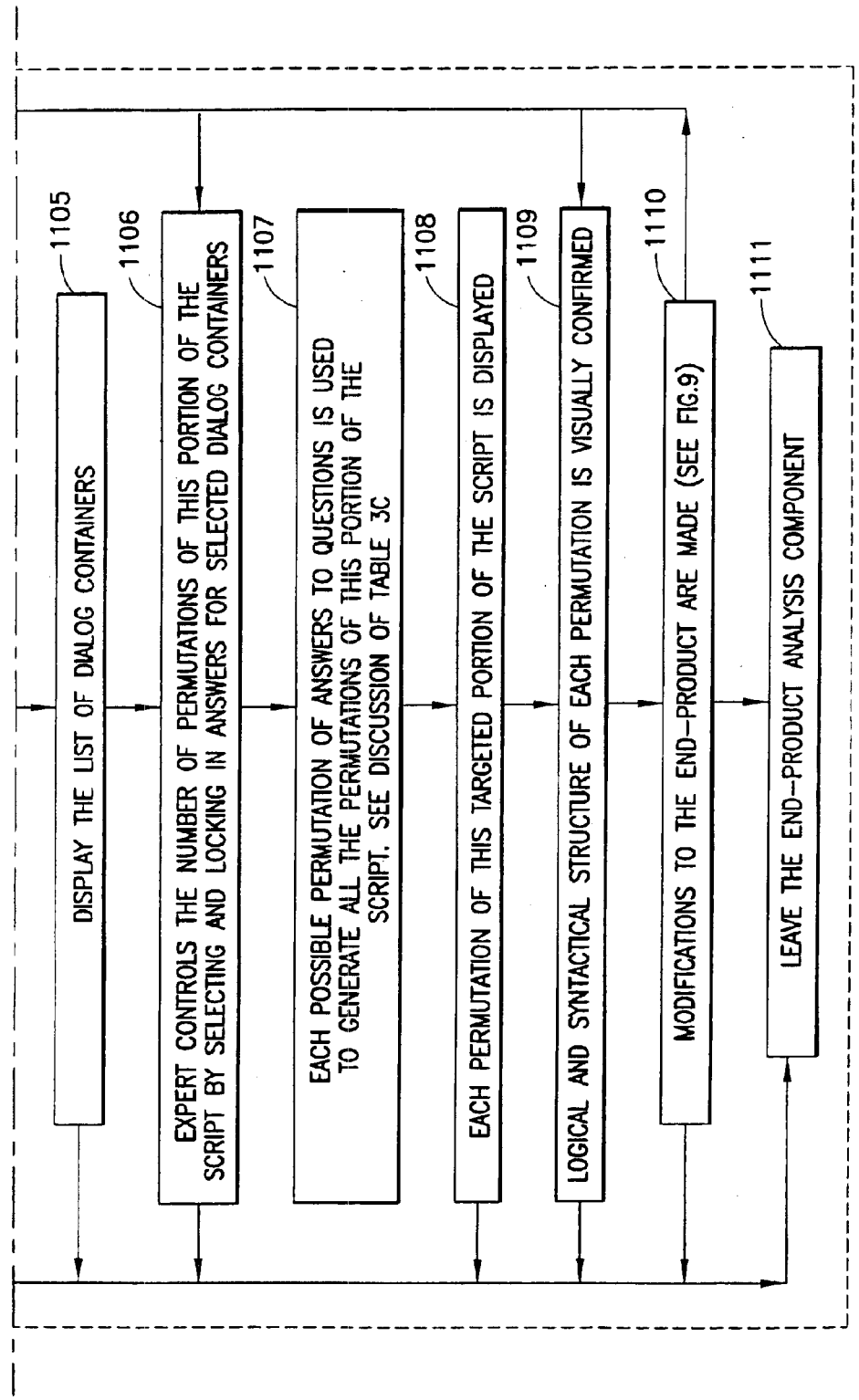

For purposes of quality control, the present invention includes, in the end-product designer (112), a sentence analysis facility that can be used to generate all the possible permutations of sentences at design time, represented by FIG. 11. Each permutation can thereby be checked for logical and syntactical correctness (1109). The sentence analysis facility is launched when the expert indicates the desire to analyze the permutations of the sentence (1101). The facility begins the analysis by finding all the dialog containers that are used for conditions within the sentence and its subordinates and all the dialog containers that contribute to snippets within the sentence (1102). The contributing dialog containers are then displayed to the expert in a list (1105) wherein the container name is listed alongside the container type and a selection box where a value for the answer can be indicated. The expert then looks to generate the permutations of sentences based on the permutations of possible answers or values to the questions that contribute to the sentence. The expert manipulates the question list indicating which values should be permuted and those values that should be kept constant (1106). In the next step, the indicated answer values are permuted with each permutation applied against the hierarchical script, producing the potential sentence permutations (1107). All generated permutations of sentences are then shown to the expert (1108). Should any generated sentence not be logically or syntactically correct (1109), then the script can be adjusted to account for that sentence and its associated permutation of answers (1110).

Figure 12:
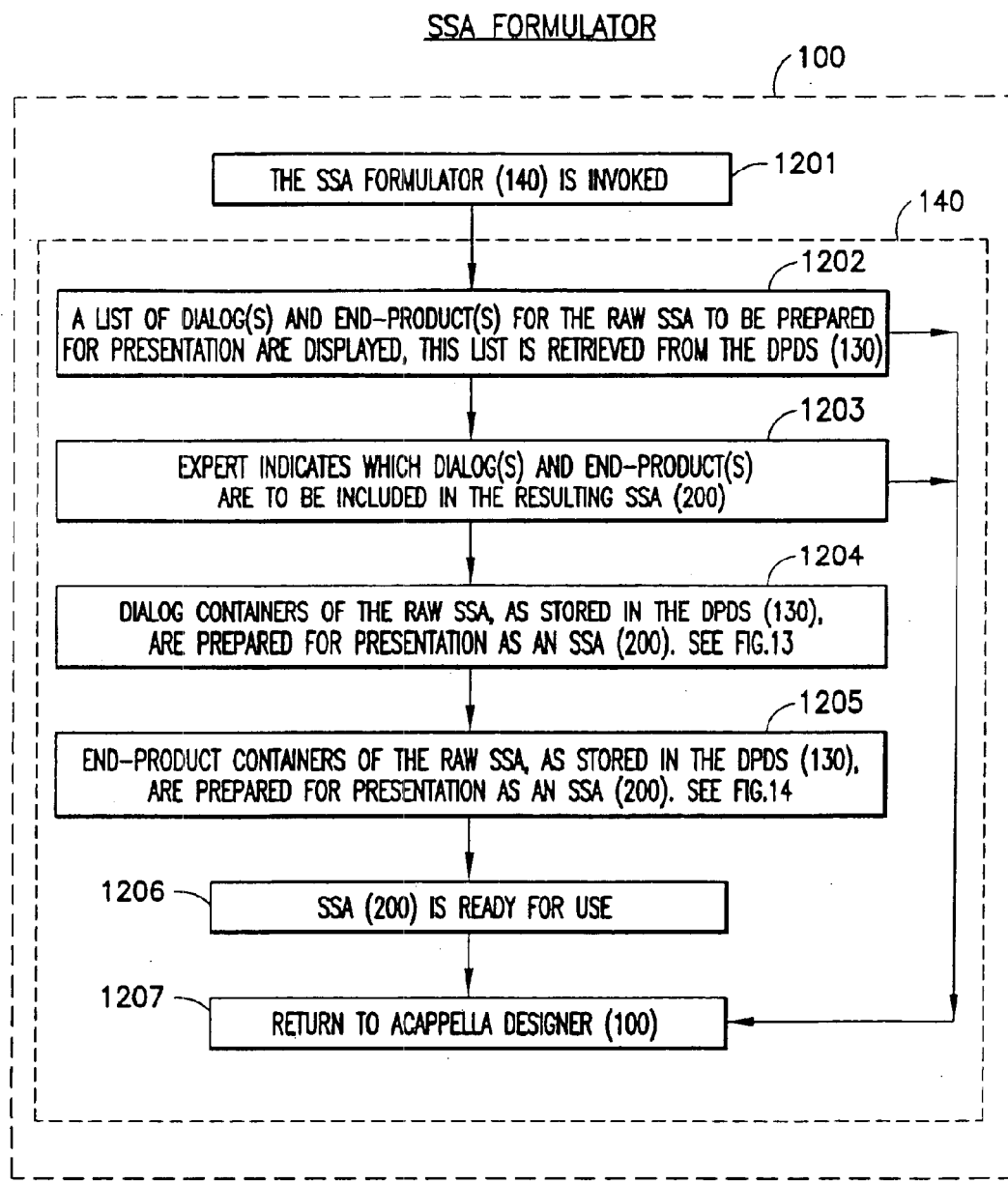
FIG. 12 is a diagram representing the method used to formulate a specialized software application based on the dialogs and end-products according to the system and method of the invention.
Figures 13, 13B:
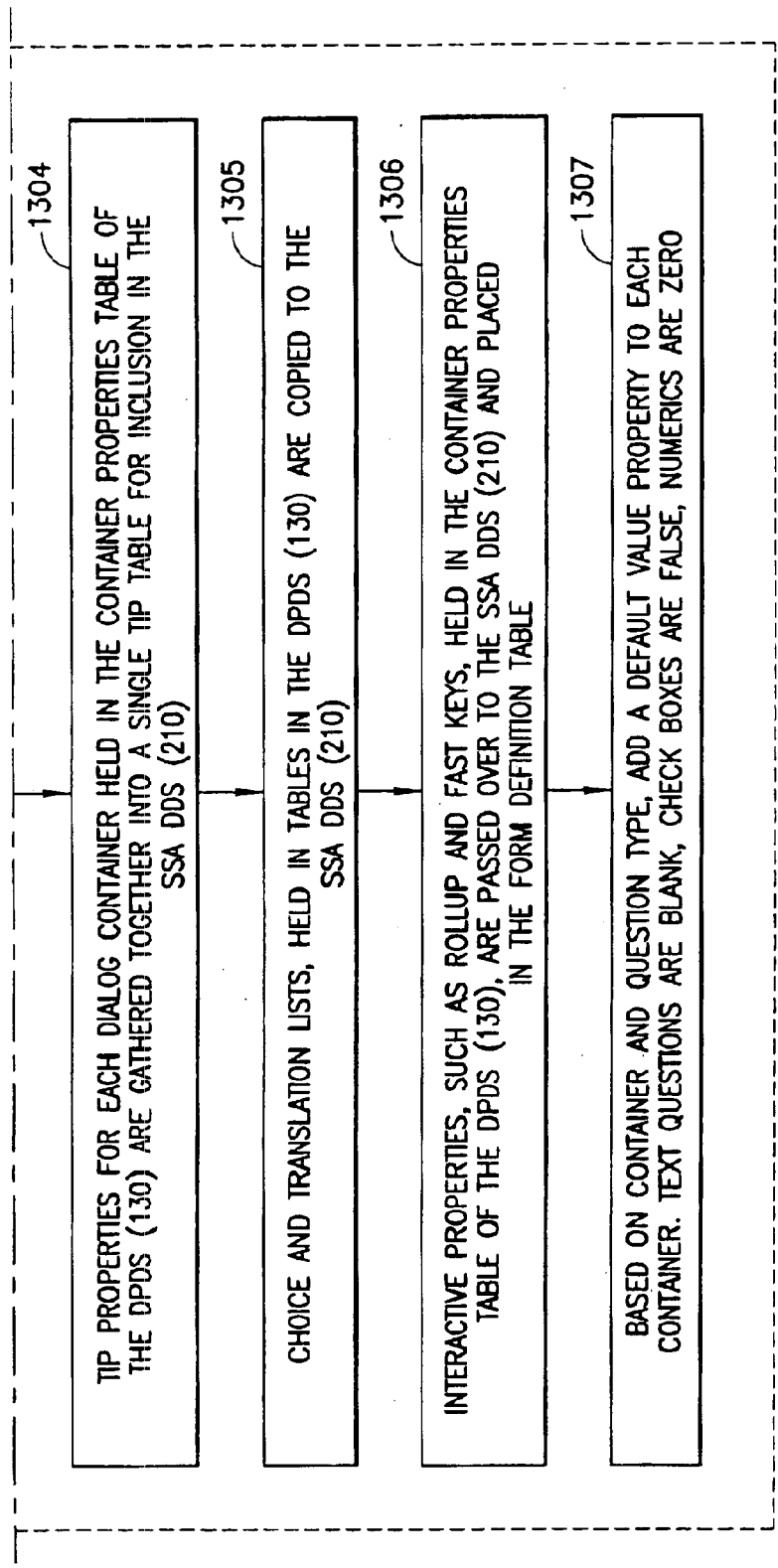
FIG. 13 is a flow diagram representing the formulating of a dialog according to the system and method of the invention.
Figure 14:
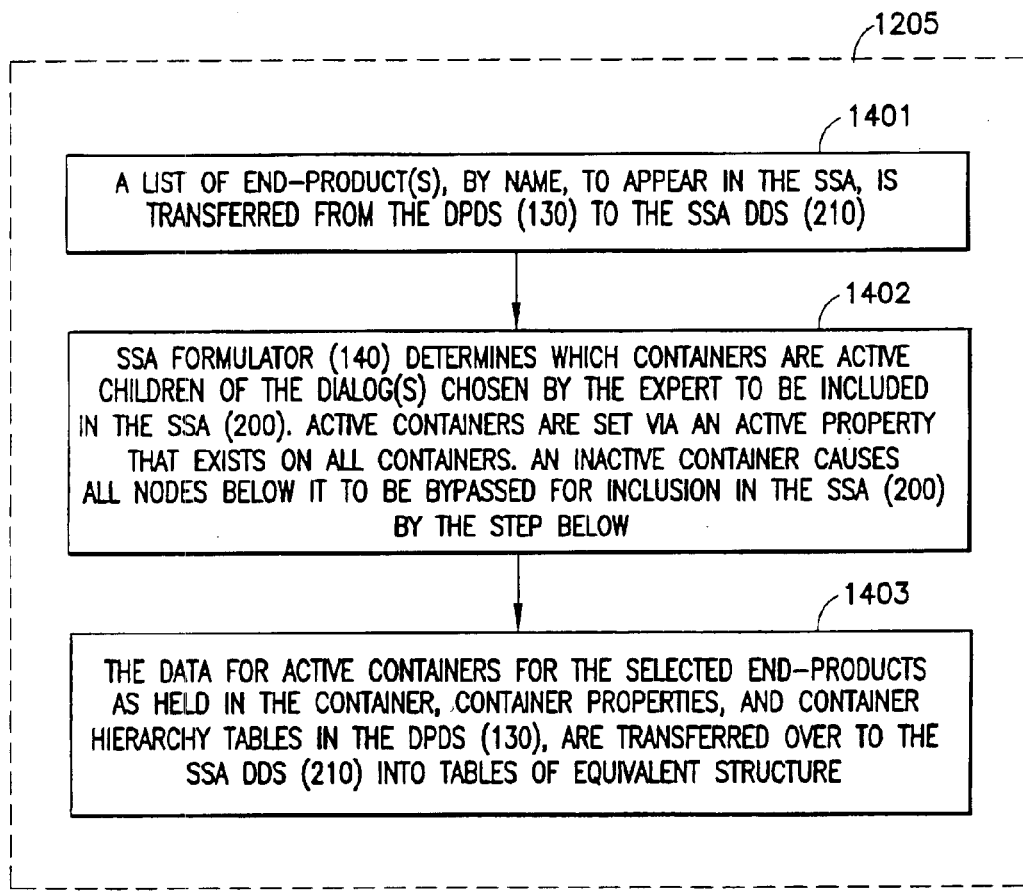
FIG. 14 is a flow diagram representing the formulating of an end-product according to the system and method of the invention.

At any point during SSA development, the expert can call upon the SSA formulator (140) to prepare the captured dialog and end-product content for presentation as an SSA (200), represented by FIG. 12. Preparation of the content requires processing and reconstitution of some containers, with the resulting data passed along or used to build data structures within the SSA definition data structure (210) and the SSA interaction data structure (220). In some cases, the SSA formulator (140) passes data directly from the designer project data structure (130) to the SSA definition data structure (210). The actions required to build and populate these two data structures consist of the following events:

The expert indicates which dialogs and end-products will be used (1203) to constitute an SSA (200).

The SSA formulator (140) begins processing through the dialog (1204), and then the end-product (1205), by first determining which containers have had their active property maintained as true (1301, 1402). These containers will continue to be processed for inclusion in the SSA (200).

The hierarchy of the dialog content (1302), from SSA container down to topic, as stored in the designer project data structure (130) is converted into a single data source that will be used to populate the SSA dialog tree (table of contents). This data source contains the names of the sections, subsections, topic groups, and topics as well as their respective relationships. The data source is stored in a table in the SSA definition data structure (210).

The display properties of each question of the dialog, necessary for the presentation of the questions when a topic is selected in the SSA (200), are determined (1303). For instance, the height and width requirements and relative positioning of each question on the screen are mathematically calculated for each topic that contains questions. The phrasing of the question is taken from the caption property, and if no caption was provided, from the name property. Other display elements are determined from properties such as the visible and enabled properties. These properties reside in the designer project data structure (130). These properties are further supplemented by basic property values, necessary for the display of the question, that are stored in the designer definition data structure (120). The complete set of property data for each question to be presented in the SSA (200) is transferred into the SSA definition data structure (210) into a form definition table.

Tip properties used in the dialog are collated (1304) by the SSA formulator (140) into a single table in the SSA definition data structure (210).

The SSA formulator (140) copies (1305) the choice list and translation tables from the designer project data structure (130) into the SSA definition data structure (210).

Any other properties that are generated through the use of the dialog designer (111), including external database links (400) and references to executable programs (300), are passed (1306) to the SSA definition data structure (210) for use within the SSA (200). This includes the rollup flags and the fast key topic properties.

For all dialog containers, a default value property is added (1307) indicating an initialization value for each container that appears in the SSA (200).

The list of end-products (240) is collated and passed to a table (1401) in the SSA definition data structure (210). Names of the end-products (240) are drawn from the captions for the end-product level containers (highest level of container) in the end-product scripts.

The end-product scripts, as created by the end-product designer (112), are passed directly (1403) from the designer project data structure (130) to a table within the SSA definition data structure (210) by the SSA formulator (140).

Once these processes are completed, the SSA (200) is ready to be reviewed in the case of an iterative or testing process or used (1206) in the case of an SSA (200) that is being released internally or publicly.

Figure 15:
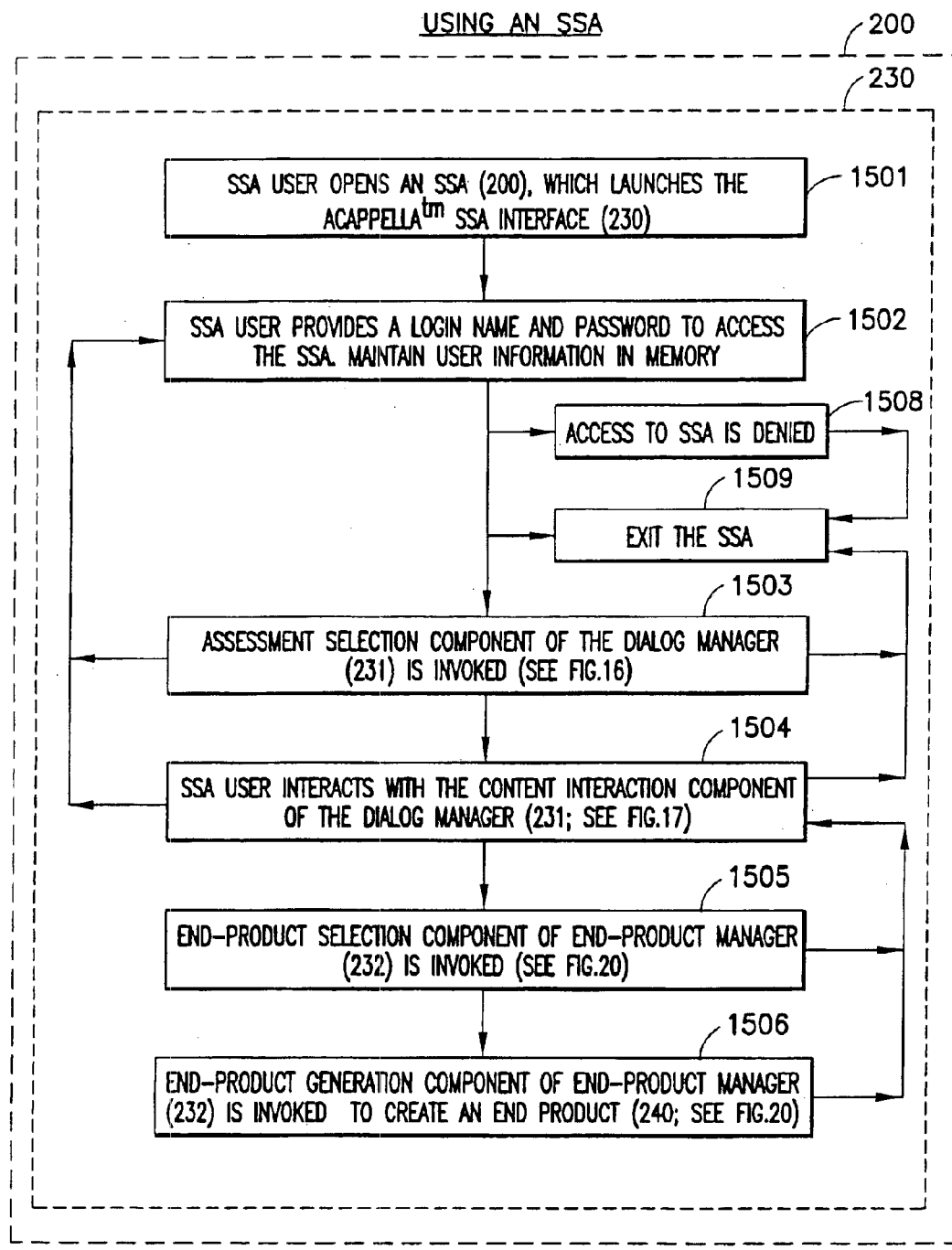
FIG. 15 is a flow diagram representing the use of a specialized software application according to the system and method of the invention.
Figure 16B:
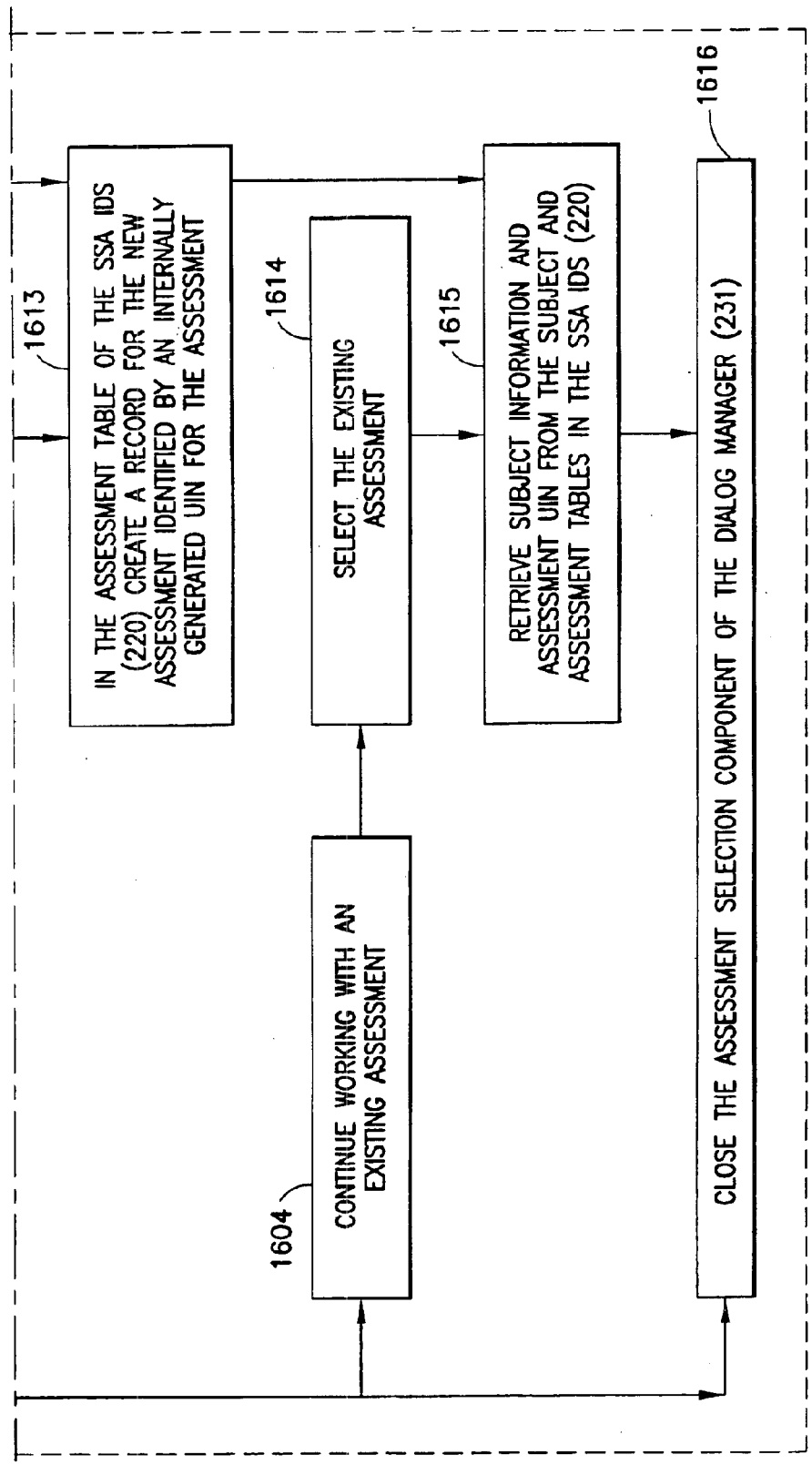
FIG. 16 is a flow diagram representing the assessment selection component of the dialog manager according to the system and method of the invention.

When an SSA (200) is launched (1501), represented by FIG. 15, on a personal computer or a request is made to access the SSA from across a network or over the World Wide Web, the SSA security manager component of the administrative manager (233) is invoked. The security layer requires a valid userid and password (1502) if the SSA user is to access (1508) the SSA (200). Note that the security layer is also used to determine which topics in the hierarchy the SSA user has the right to access. An SSA administrator manages this security layer. They have access to an administrative facility wherein they can establish valid userids, set access rights and privileges to specific assessments, and set access control for users to the topics within the SSA dialog. All these administrative settings are stored in the SSA definition data structure (210).

Once the SSA user has gained access to the SSA (200), he is asked to select (1503) an assessment to work with. This process is handled by the assessment selection component (1503) of the dialog manager (231), represented by FIG. 16. The assessment selection component assumes there are two key elements that make each assessment unique. The first element is the identity of the thing being assessed (referred to as the subject of the assessment). Identity is usually determined by a name, a descriptor, a geographic location, or a unique identifying number (e.g., a social security number, a contract number, an identification number, etc.). Regardless, there is a unique way to identify the subject (1610) of the assessment. The second element is a date or date/time combination for the assessment (1613), which allows the subject to be assessed multiple times. Internal to the SSA, both the subject and assessment have UINs generated for them (1611–1613).

Figure 17:
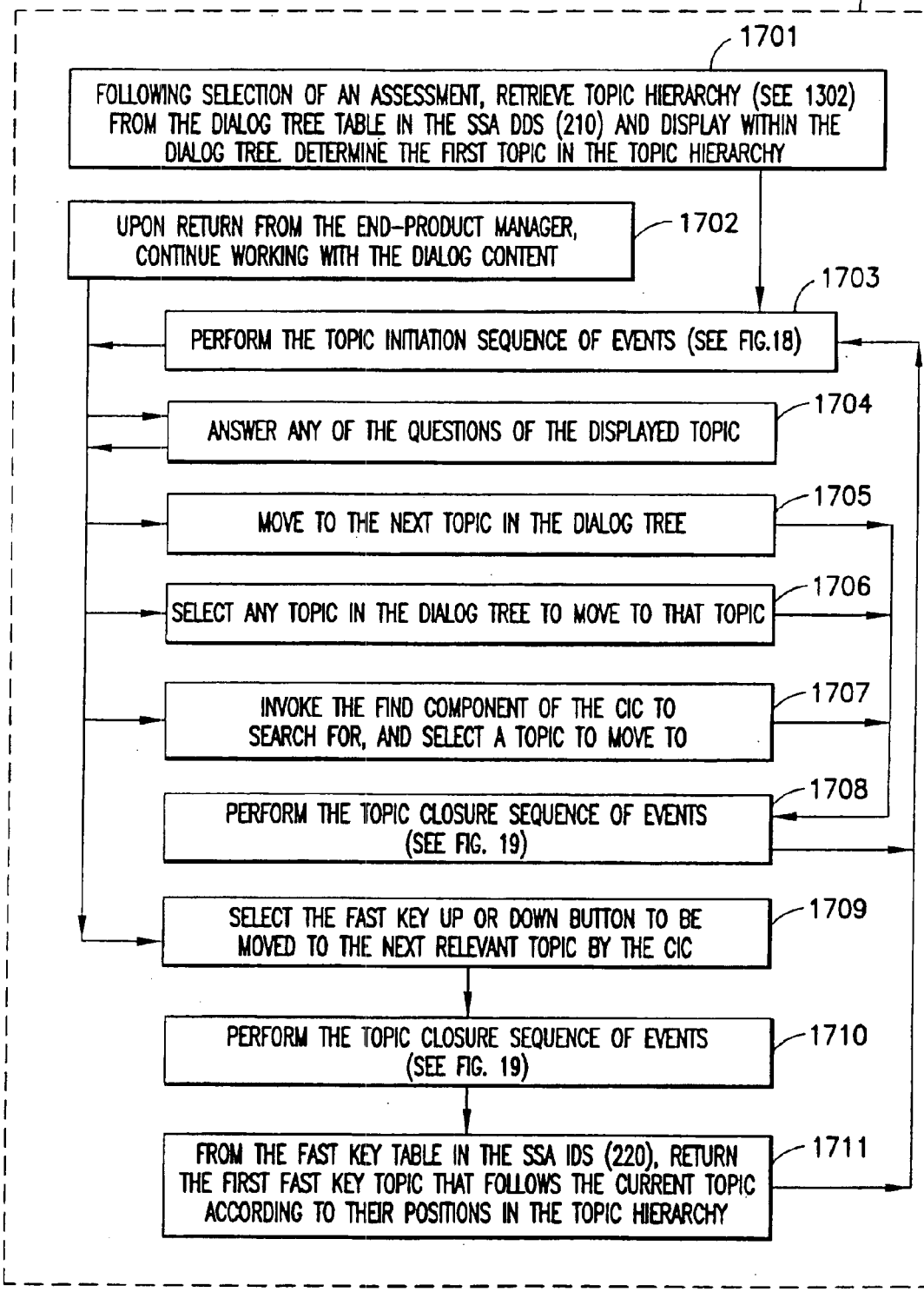
FIG. 17 is a flow diagram representing the content interaction component of the dialog manager according to the system and method of the invention.
Figure 18:
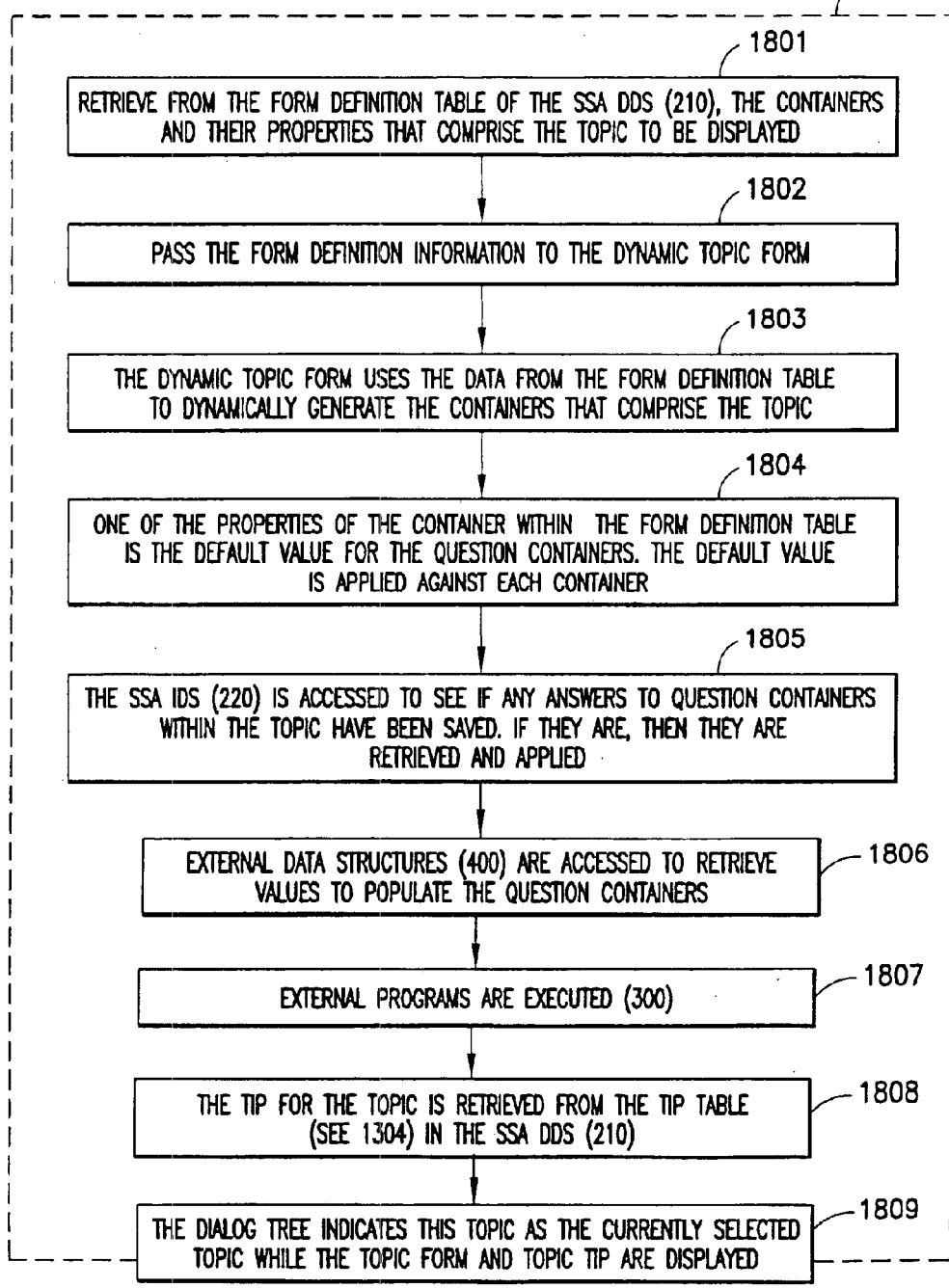
FIG. 18 is a flow diagram representing the topic initiation sequence in the content interaction component of the dialog manager according to the system and method of the invention.

If the SSA user has used the product previously, the assessment selection component has extracted from a table in the SSA interaction data structure (220), a limited list of the assessments he has recently conducted (1603, 1604). This list is presented to the SSA user in reverse chronological order in a recent assessment interface. If the SSA user chooses to continue working with a previously conducted assessment (1604), the user selects an assessment (1614). The assessment selection component takes the subject and assessment UINs and sets them in memory as pointers to the correct subject and assessment (1615). The content interaction component of the dialog manager (231), represented by FIG. 17, is invoked (1504) and the SSA user proceeds to work in the dialog.

The SSA user may look to re-assess (1603) a subject they recently assessed. If that is the case, the SSA user selects a previously conducted assessment (1612) and then indicates a re-evaluation is being conducted. In this case, the assessment selection component sets the previously discussed subject id pointer in memory, but then it creates a new assessment (1613) in the SSA interaction data structure (220) and uses the new assessment id as the pointer in memory.

In most cases, a re-evaluation is done to determine if any differences exist from a previous evaluation. To mirror this process, the assessment selection component uses the data from the previous assessment as the baseline data for the re-evaluation, i.e., all the data from the previous evaluation is used as a template for the re-evaluation. For the SSA user, re-evaluation only requires him to answer questions that are different from the prior assessment. Still, the reassessment is a new assessment with a different date or date/time and UIN indicating a unique assessment.

If the SSA user wishes to work with an existing assessment that is not in their recent list but exists within the SSA interaction data structure (220), they proceed to an existing assessment interface. The existing assessment interface allows the SSA user to search the identifying information for a subject and/or lists the subjects in identifying information order. The SSA user selects a subject and the assessments conducted for that subject are displayed. The SSA user then selects an assessment and, as above, can either continue working with that assessment (1604) or re-evaluate (1603). The assessment selection component conducts the appropriate processes and sets in memory the UINs for the subject and assessment.

Finally, the SSA user can be conducting an assessment on a subject for the first time (1602). If that is the case, then the SSA user proceeds to the interface for adding a subject. To add a subject, the SSA user answers questions that uniquely identify the subject (1610). After providing the information, the assessment selection component creates (1611) a UIN for the subject and UIN for the assessment, saves them in the SSA interaction data structure (220), and retains those UINs as pointers in memory. Once an assessment has been identified, the assessment selection component is closed (1616) and the content interaction component of the dialog manager (231), represented by FIG. 17, is invoked (1504).

Upon invocation the content interaction component retrieves from the SSA definition data structure (210), the data that will populate the dialog tree (1701). Having access to the dialog tree, the content interaction component now determines the first topic in the tree and begins the topic initiation sequence of events (1703), represented by FIG. 18. The topic initiation sequence begins by extracting (1801) the display properties for the containers that comprise the first topic from the form definition table in the SSA definition data structure (210). Having retrieved this information, the dialog manager (231) renders the questions inside the topic area, preparing it for display, using a dynamic topic form (1802). This dynamic form is a template from which all topics that are defined in the form definition table can be created by instancing the third party controls that are used to render the various questions. As the questions are rendered (1704), the dialog manager (231) uses the default value property to populate the answer (1804) to the question. The content interaction component then uses the UIN to retrieve, from the SSA interaction data structure (220), any previously provided answers (1805) for the questions being rendered. If any data need to be retrieved from an external database (1806), this action is conducted. Following this, the content interaction component retrieves from the tip table (1808) in the SSA definition data structure (210) the tip for the topic to be displayed in the tip box located below the dialog tree. Upon display to the SSA user, the questions are therefore rendered and populated with values, the topic tip is populated, and the dialog tree is opened to the first topic (1809). This completes the topic initiation sequence.

The SSA user can now interact with the SSA (200). If he so chooses, the SSA user can request that the tip in the tip box be populated by tips for the questions. If so requested, then each time a question is selected, the dialog manager (231) populates the tip box with a corresponding question tip. The SSA user can otherwise answer any of the questions (1704) that appear in the topic area. Once they have completed answering any of the questions for the topic, the SSA user can navigate their way to a new topic. There are four ways to navigate the topics.

1) The dialog tree is used whereby a topic is selected directly from the tree (1706).
2) Navigation buttons are provided that can be used to move one topic or group of topics at a time (1705).
3) A find facility can be used to search for topics and questions by keyword. When a topic or question is found, the facility will jump the SSA user to the topic (1707).
4) There is a fast key system (1709) that jumps the SSA user to the topics in order of those that they have identified as likely to require their attention. The fast key system is a set of pre-set topic "stop points" in the dialog tree. The expert sets these stop point topics during the design phase of SSA development by tying them to the answers of certain questions or rollup values for containers that become flagged as true. Each container has a fast key topics property that indicates the topics that should be set as fast key system stop points should the question be answered. Inside the SSA, when that question is answered, the fast key system sets those designated topics as stop points should the fast key system be used for navigation. Access to the fast key system of topics in the SSA (200) is provided via two buttons, an up and down button, which indicate the direction on the tree that the SSA user wants to jump. When the fast key up or down button is selected, the fast key system looks at the fast key topic table, determines which topic is the next stop point in the selected direction, and jumps to that topic. The fast key system offers the option of guiding the direction of the assessment on behalf of the SSA user.

As soon as a method of navigation is used to select a new topic to be displayed, the topic closure sequence of events (1708) occur, represented by FIG. 19. These events process the currently active topic to close it out and occur before the topic initiation sequence (1703) of the newly selected topic. The first significant closure event is saving of the answers to questions (1902) back to the SSA interaction data structure (220).

The second event is the execution of the rollup process (1903). Any change to a non-default answer (1904) to any of the questions by the SSA user causes the rollup facility to see if the parent container of that question should be set to true or false (1905). So any question that has been answered as non-default causes its parent container to be set to true (1906). If none of the question container children have been answered, or their answers have been reset to the default, then the parent container rollup value is false. If the parent containers to the questions of this topic, or any of this parent container's siblings are true, then the parent of the parent, i.e. the grandparent container is set to true and so on up through the hierarchy (1908). This process is one of inverse propagation of values up the hierarchy. The rollup value for each container is saved in the SSA interaction data structure (220).

The final process launched is related to the Fast Key system that has been described in detail above. When the answers are being saved, the Fast Key system determines if any of the questions (1910) are associated with fast key topic stop points (1911). If they are, then the identified fast key topic is saved as a record (1912) in a fast key stop table in the SSA interaction data structure (220).

Once these three processes have completed, the content interaction manager completes the steps necessary to close the old topic. Completion of the topic initiation sequence (1903) for the newly selected topic displays that topic.

While working in the dialog, the SSA user has access to a free-form notes facility that can associate a note to any topic. This facility is handled by the notes component of the dialog manager (233). Notes are accessed by selection from the menus or the notes icon. Upon selection, an interface appears that offers an opportunity to generate either a public note, that is a note that can be seen by anyone with access to that client and topic, or a private note which is only for the eyes of the writer. Notes are saved in a table in the SSA interaction data structure (220).

Figure 20:
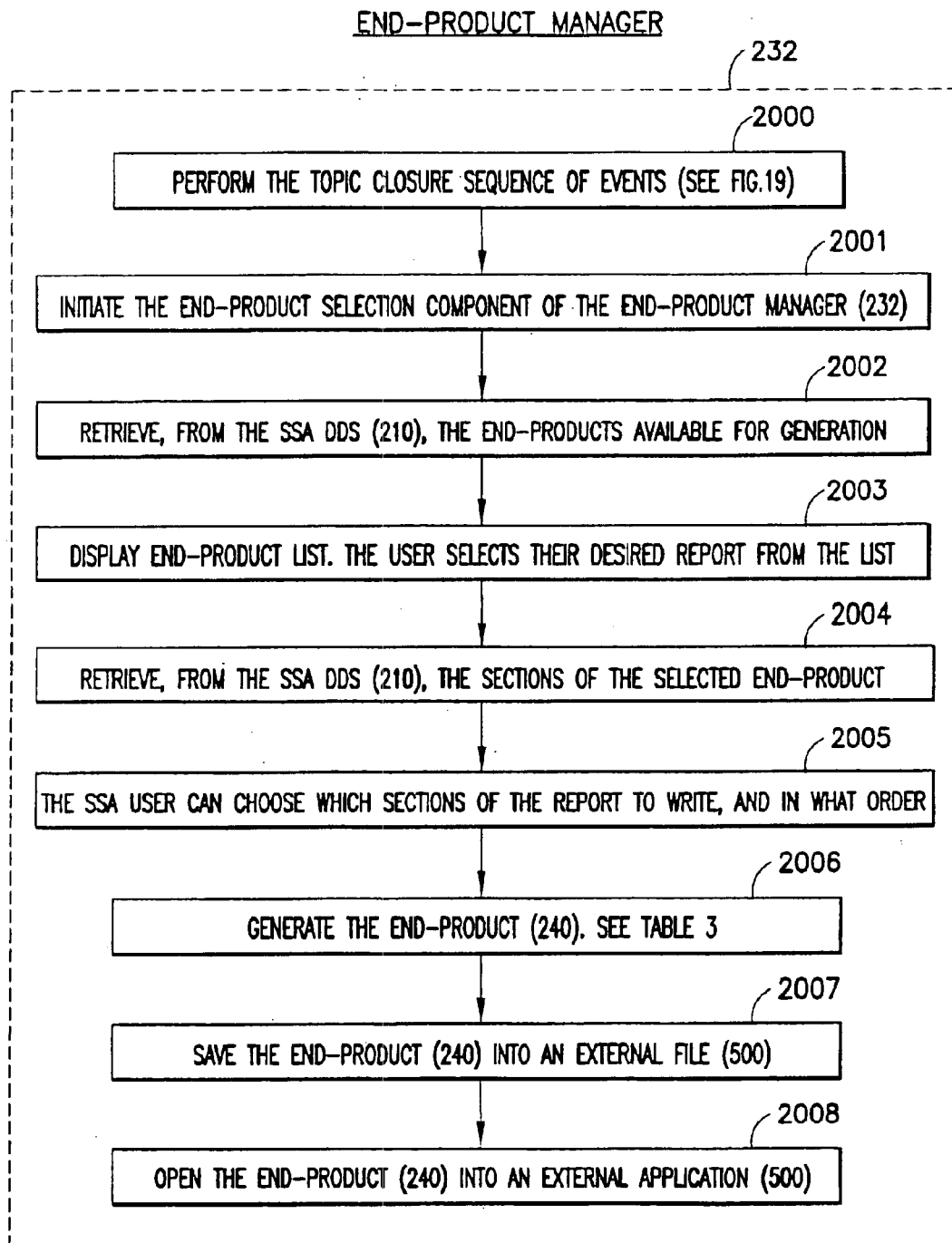
FIG. 20 is a flow diagram representing the process of producing the end-product according to the system and method of the invention.

Upon a request to generate an end-product (240), the end-product manager (232) appears to the SSA user, represented by FIG. 20. Upon invocation, the list of end-products is retrieved (2002) from the SSA definition data structure (210). The SSA user selects from the list (2003) the end-product (240) they wish to generate. The SSA user can then refine their selection by choosing only certain sections (2005) of a report to generate. After selection, the end-product manager (232) invokes the end-product generation component (2006) to generate the end-product (240), represented by FIG. 21. The end-product manager (232) passes to the end-product generation component each section as a target container. The end-product generation component begins at the target container (2101) and works down through the particular portion of the script hierarchy. The process relies on the SSA user's answers to questions to analyze the conditions (2103) and determine the path through the script that is used to generate the end-product (240). Each time a condition is found to be true, any initial formatting is performed (2105), and then the child of the container is analyzed (2106). Via this methodology, sections, subsections, paragraphs, sentences, and phrases are analyzed via the end-product generation component until the process reaches the snippet. Snippets provide the text that is passed up to the phrases. Phrases and snippets together are passed up to sentences. Sentences are assembled into paragraphs, and paragraphs into subsections and sections. As assembly at each level is completed, i.e., all its children have been analyzed and all text items have been passed back to it, then the level is formatted (2108). The process thereby works its way down to the snippet and back out to the originally targeted container (2109).

This scripting process confers a number of advantages for an SSA (200) and corresponding end-product generation (240):

1) Separation of information gathering from end-product generation. The generation of the report is unlinked from the answering process, i.e. they are separate activities. Most report writing software applications generate their narrative text as questions are answered. This means that answering questions is directly linked to generating narrative. This requirement forces the user to answer a series of questions in the same order as the writing needs to occur—a requirement that imposes an artificial structure upon the evaluative process. The present invention, having unlinked the two processes, allows the evaluative dimension to occur without restrictions as to order or sequence as befits the expert thought process.

2) Multiple end-product generation. Having unlinked the end-product generation from the data gathering allows multiple end-products to be easily and effectively produced from one set of answers.

3) Better written products. Most report writing software programs generate narrative that is stiff, choppy, or repetitive. With respect to narrative scripting, the present invention can be made to be sensitive to the need for transition phrases, i.e. conjunctions (such as furthermore, moreover, therefore, as well, etc.) that link sentences. This links improve the readability of a document. The power of this capability lies in ability to determine the sentences that have been previously written. By accounting for previous writing, appropriate transitions can be set up to make the reading of the narrative appear more fluid and natural.

4) Syntactically accurate writing. The sentence analysis capability that is available in the end-product designer (112) allows the expert to check that all permutations of sentences generated are syntactically correct. If they are not, a unique branch in the scripting process can be created to specifically account for such problems. There is therefore an opportunity to eliminate awkward or stiff syntactical structure from the end-product (240). This leads to high quality in the writing.

5) Random selection between alternatives. The facility incorporates a random selection function that can be applied to paragraphs, sentences, phrases, and snippets insuring that two reports generated from the same set of answers will appear similar but not the same. This randomization capability, when implemented, insures that the text does not become too static and contains some variability.

6) Speed of narrative generation. End-product (240) generation is a rapid and efficient process. This is because a branch of the hierarchy is only processed when the conditional statement that controls entry to the subsequent children is tested and confirmed as true. All computing effort therefore is spent following paths that lead to sentence generation and there is very little wasted computing effort.

At the end of the generation process, the resulting end-product (240) is saved (2007) in a file on an available hard drive then opened (2008) into a word-processing or other appropriate software so the SSA user may edit or manipulate the result.

A final note on the administrative manager (233). This component also has a facility for establishing and tracking the status of the assessment and its reports (e.g., assessment completed or not completed, report not available or report available, etc.). Status definitions exist within the SSA definition data structure (210) and status for a given assessment is kept with the assessment data in the SSA interaction data structure (220).

The Acappella SSA Interface (230), by nature of the way the components function and are written, can be displayed and accessed through different media. Those media include personal computers as a software application, via the World Wide Web as a web page, or on a personal digital assistant. Future iterations will be tailored to any medium as necessary.

EXAMPLE

A representative example of how a SSA is built and used follows. The tables represent various states, or moments in the development or use of an SSA.

This example uses, as its broad basis, a speech and language assessment, and more specifically the evaluation of a child's hearing and a corresponding section of narrative on hearing. The expert is developing a dialog that will include questions about hearing. Topics can include a diagnosed hearing problem, any rehabilitative technology (hearing aids) being used, history of the hearing loss, results of a hearing screening, and results of a full audiological examination. For purposes of this example, an oral peripheral exam is referred to in the dialog but not expanded.

Also to be created is a corresponding end-product script to cover the potential topics considered by a professional during a hearing assessment. For purposes of this example, the script completely follows through on only one model sentence.

Where appropriate, this example of use and tables herein will refer to the steps taken in the use of the current invention as detailed in FIGS. 4 through 20. Steps are numbered such that the digits that prefix the last two digits represent the figure while the last two digits represent the step within the figure. Step numbers are in bold.

Table 1A below is a dialog that the expert has outlined and must input into the current invention.

TABLE 1A

Speech and Language Dialog

1. Speech and Language Assessment
    1.1. Oral Peripheral Exam Section
    1.2. Hearing Section
        1.2.1. Diagnosed Hearing Problem Topic
        1.2.2. Rehabilitative Technology Topic
            1.2.2.1. FM Wireless Listening Devices Question Group
                1.2.2.1.1. Style of System Question (Not Applicable; Behind-the-Ear (BTE); Personal; Educational; Sound Field)
                1.2.2.1.2. Is an FM System Used in the Classroom Question (Yes/No)
                1.2.2.1.3. Is an FM System Used at Home Question (Yes/No)
                1.2.2.1.4. Is an FM System Used in Theatres Question (Yes/No)
                1.2.2.1.5. Is an FM System Used in Therapy Question (Yes/No)
                1.2.2.1.6. Is an Environmental Microphone Used Question (Yes/No)
        1.2.3. History of Hearing Loss Topic
        1.2.4. Hearing Screening Topic
        1.2.5. Audiological Exam Results Topic To begin, the expert needs to launch the current invention, create a project to hold this SSA, and design an SSA; 401–404, 1001, 1002, 1010, 1011, 1021–1024, 1007, 1008, 405, 501.

Table 1B indicates the steps necessary to create the containers of the hierarchy according to Table 1A.

TABLE 1B

Steps Required to Produce the Speech and Language Dialog

1. Speech and Language Assessment; 501, 502, 503, 601–611, 701, 702, 703, 710, 730, 703, 701, 504, 801
    1.1. Oral Peripheral Exam Section; 801, 802, 803, 601–611, 701, 702, 703, 710, 730, 703, 701, 802
    1.2. Hearing Section; 802, 803, 601–611, 701, 702, 703, 710, 730, 703, 701, 802
        1.2.1. Diagnosed Hearing Problem Topic; 802, 803, 601–611, 701, 702, 703, 710, 730, 703, 701, 802
        1.2.2. Rehabilitative Technology Topic; 802, 803, 601–611, 701, 702, 703, 710, 730, 703, 701, 802
            1.2.2.1. FM Wireless Listening Devices Question Group; 802, 803, 601–611, 701, 702, 703, 710, 730, 802
                1.2.2.1.1. Style of System Question (Not Applicable; Behind-the-Ear (BTE); Personal; Educational; Sound Field); 802, 803, 601–611, 701, 702, 703, 710, 730, 703, 714, 730, 703, 701, 802
                1.2.2.1.2. Is an FM System Used in the Classroom Question (Yes/No); 802, 803, 601–611, 701, 702, 703, 710, 730, 703, 701, 802

TABLE 1B-continued

Steps Required to Produce the Speech and Language Dialog 1.2.2.1.3. Is an FM System Used at Home Question (Yes/No);
     802, 803, 601–611, 701, 702, 703, 710, 730, 703, 701, 802
   1.2.2.1.4. Is an FM System Used in Theatres Question
     (Yes/No); **802, 803, 601–611, 701, 702, 703, 710, 730,
     703, 701, 802**
   1.2.2.1.5. Is an FM System Used in Therapy Question (Yes/No);
     802, 803, 601–611, 701, 702, 703, 710, 730, 703, 701, 802
   1.2.2.1.6. Is an Environmental Microphone Used Question
     (Yes/No); **802, 803, 601–611, 701, 702, 703, 710, 730,
     703, 701, 802**
  1.2.3. History of Hearing Loss Topic; **802, 803, 601–611, 701, 702, 703
   710, 730, 703, 701, 802**
  1.2.4. Hearing Screening Topic; **802, 803, 601–611, 701, 702, 703, 710,
   730, 703, 701, 802**
  1.2.5. Audiological Exam Results Topic; **802, 803, 601–611, 701, 702,
   703, 710, 730, 703, 701, 802**

With a dialog in place, the expert begins to develop a model end-product. At the highest level of organization that model, following from the structure of the dialog, could take the (incomplete) shape of Table 2A below.

TABLE 2A

High Level Model of a Speech and Language End-Product

2. Speech and Language Report
 2.1. Oral Peripheral Exam Narrative
 2.2. Hearing Narrative
  2.2.1. Diagnosed Hearing Problem Paragraph
  2.2.2. Rehabilitative Technology Paragraph
   2.2.2.1. Uses FM Wireless Hearing Devices Sentence
   2.2.2.2. Uses Hardwire Hearing Devices Sentence
  2.2.3. History of Hearing Loss Paragraph
  2.2.4. Hearing Screening Paragraph
  2.2.5. Audiological Exam Results Paragraph To begin scripting an end-product, the expert follows the steps in Table 2B to produce each container in the hierarchy detailed in Table 2A. The sequence picks up where Table 1B left off.

TABLE 2B

Steps Required in the High Level Model of a Speech and Language End-Product

2. Speech and Language Report; **802, 901, 511, 512, 513, 601–611, 701, 702,
 703, 721, 730, 703, 701, 514, 901**
 2.1. Oral Peripheral Exam Narrative; **901, 902, 903, 601–611, 701, 702, 703,
  721, 730, 703, 720, 730, 703, 701, 722, 730, 703, 701, 902**
 2.2. Hearing Narrative; **902, 903, 601–611, 701, 702, 703, 721, 730, 703,
  720, 730, 703, 701, 722, 730, 703, 701, 902**
  2.2.1. Diagnosed Hearing Problem Paragraph; **902, 903, 601–611, 701,
   702, 703, 721, 730, 703, 720, 730, 703, 701, 722, 730, 703, 701, 902**
  2.2.2. Rehabilitative Technology Paragraph; **902, 903, 601–611, 701,
   702, 703, 721, 730, 703, 720, 730, 703, 701, 722, 730, 703, 701, 902**
   2.2.2.1. Uses FM Wireless Hearing Devices Sentence; **902, 903, 601–
    611, 701, 702, 703, 721, 730, 703, 720, 730, 703, 701, 722,
    730, 703, 701, 902**
   2.2.2.2. Uses Hardwire Hearing Devices Sentence; **902, 903, 601–
    611, 701, 702, 703, 721, 730, 703, 720, 730, 703, 701, 722, 730,
    703, 701, 902**
  2.2.3. History of Hearing Loss Paragraph; **902, 903, 601–611, 701, 702,
   703, 721, 730, 703, 720, 730, 703, 701, 722, 730, 703, 701, 902**
  2.2.4. Hearing Screening Paragraph; **902, 903, 601–611, 701, 702, 703,
   721, 730, 703, 720, 730, 703, 701, 722, 730, 703, 701, 902**
  2.2.5. Audiological Exam Results Paragraph; **902, 903, 601–611, 701,
   702, 703, 721, 730, 703, 720, 730, 703, 701, 722, 730, 703, 701, 902**

The disclosure of the steps in Table 2B refer to a step 720, which is a conditional statement (an optional step for a container). The conditions in Table 2B use the rollup value carried by the corresponding section, topic, or question group container that will result during the use of the SSA. This factor will be revisited in detail below when discussion, turns to the use of the SSA and generation of the end-product.

With a model infrastructure in place, the expert develops model sentences that must now be input. Based on the questions that comprise the FM Wireless Listening Devices Question Group in Table 1A, the expert perhaps decides upon a model narrative sentence for the Uses FM Wireless Devices Sentence in Table 2A as follows:

{first name} uses {an} {behind the ear (BTE), educational, sound field, personal} FM system {with an environmental microphone}{{at home}, {in the classroom}, {in theatres}}.

The model narrative indicates the portions of text that need to be brought together to form a sentence. This model sentence is broken into its composite parts, i.e. into phrases and snippets, and input into the end-product designer (112) as a script. A description of the scripted process is shown in Table 3A as follows.

TABLE 3A

Analysis of Uses FM Wireless Devices Sentence

3. Sentence: Determine if FM Wireless Listening Devices Question Group is true
    3.1. Snippet: retrieve and include {What is the First Name of the Child}
    3.2. Snippet. include text "uses"
    3.3. Phrase: determine if the text that follows requires inclusion of an "a" or "an"
        3.3.1. Phrase: retrieve {Style of System} and if the answer is other than Not Applicable then:
            3.3.1.1.  Snippet: Translate Style of System answer to one of the following:
                3.3.1.1.1. if answer is Behind-the-Ear (BTE), then include "behind-the-ear (BTE)"
                3.3.1.1.2. if answer is Personal, then include "personal"
                3.3.1:1.3; if answer is-Educational, then include "educational"
                3.3.1.1.4. if answer is Sound Field. then include "sound field"
        3.3.2. Snippet: include text "FM system"
    3.4. Phrase: is {Is an Environmental Microphone Used} true
        3.4.1. Snippet: include "with an environmental microphone"
    3.5. Phrase: determine if one or two items follows; if two, include between the items text "and"
        3.5.1. Phrase: is {Is an FM System Used at Home} true
            3.5.1.1.  Snippet: include "at homes"
        3.5.2. Phrase: is {Is an FM System Used in the Classroom} true
            3.5.2.1.  Phrase: Randomly select one of the following
                3.5.2.1.1.  Snippet: include "in class"
                3.5.2.1.2.  Snippet: include "in the classroom"
        3.5.3. Phrase: is {Is an FM System Used in Theatres} true
            3.5.3.1.  Snippet: include "in theatres"

To script the sentence as presented in Table 3A, the steps indicated in Table 3B are required:

TABLE 3B

Steps Required to Script Uses FM Wireless Devices Sentence

3. Sentence: Determine if FM Wireless Listening Devices Question Group is true; 901, 902, 903, 601–611, 701, 702, 703, 721, 730, 703, 720, 730, 703, 701, 722, 730, 703, 701, 902 (as noted in 2.2.2.1)
    3.1. Snippet: retrieve and include (What is the First Name of the Child); 902, 903, 601–611, 701, 702, 703, 723, 730, 703, 701, 902
    3.2. Snippet: include text "uses"; 902, 903, 601–611, 701, 702, 703, 723, 730, 703, 701, 902
    3.3. Phrase: determine if the text that follows requires inclusion of an"a" or "an"; 902, 903, 601–611, 701, 702, 703, 721, 730, 703, 720, 730, 703, 722, 730, 703, 701, 902 (Note: 722 refers to a property that, when true, precedes the text that it receives with "a"or "an")
        3.3.1. Phrase: retrieve {Style of System} and if the answer is other than Not Applicable; 902, 903, 601–611, 701, 702, 703, 721, 730, 703, 720, 730, 703, 701, 902
            3.3.1.1.  Snippet: Translate Style of System (1.2.2.1.1) answer; 902, 903, 601–611, 701, 702, 703, 721, 730, 703, 724, 730, 703, 725, 730, 703, 701, 902 (Note: 725 indicates a translation table for the choice list that incorporates 3.3.1.1.1–3.3.1.1.4)
        3.3.2. Snippet: include text "FM system"; 902, 903, 601–611, 701, 702, 703, 723, 730, 703, 701, 902
    3.4. Phrase: is {is an Environmental Microphone Used} true; 902, 903, 601–611, 701, 702, 703, 721, 730, 703, 720, 730, 703, 701, 902
        3.4.1. Snippet: include "with an environmental microphone"; 902, 903, 601–611, 701, 702, 703, 723, 730, 703, 701, 902
    3.5. Phrase: determine if one or two items follows; if two, include between the items text "and"; 902, 903, 601–611, 701, 702, 703, 721, 730, 703, 720, 730, 703, 722, 730, 703, 701, 902 (Note: 722 refers to a property that takes lists of items and wraps them in selected conjunctions such as",, and" [i.e., it determines, based on the number of items in the list, the combination of "commas" and/or when to use "and"])
        3.5.1. Phrase: is {Is an FM System Used at Home} true; 902, 903, 601–611, 701, 702, 703, 721, 730, 703, 720, 730, 703, 701, 902
            3.5.1.1. Snippet: include "at home"; 902, 903, 601–611, 701, 702, 703, 723, 730, 703, 701, 902
        3.5.2. Phrase: is {Is an FM System Used in the Classroom} true; 902, 903, 601–611, 701, 702, 703, 721, 730, 703, 720, 730, 703, 701, 902

TABLE 3B-continued

Steps Required to Script Uses FM Wireless Devices Sentence 3.5.2.1. Phrase: Randomly select one of the following; 902, 903, 601–611, 701, 702, 703, 720, 730, 703, 722, 730, 703, 701, 902
(Note: 722 refers to a property that will randomly select between the use of 3.5.2.1.1 and 3.5.2.1.2 each time an end-product is generated).
    3.5.2.1.1. Snippet: include "in class"; 902, 903, 601–611, 701, 702, 703, 723, 730, 703, 701, 902
    3.5.2.1.2. Snippet: include "in the classroom"; 902, 903, 601–611, 701, 702, 703, 723, 730, 703, 701, 902
3.5.3. Phrase: is {Is an FM System Used in Theatres} true; 902, 903, 601–611, 701, 702, 703, 721, 730, 703, 720, 730, 703, 701, 902
    3.5.3.1. Snippet: include "in theatres"; 902, 903, 601–611, 701, 702, 703, 723, 730, 703, 701, 902

Based on the possible combinations of answers to the questions; this sentence script can generate 159 different sentences. For quality control, the expert would invoke the end-product analysis component (see FIG. 11) of the end-product designer (112). Stepwise, the expert would move through 902, 908, 1101, 1102, 1103, 1104, 1105. At this point, a list of dialog containers that contribute to the sentence are displayed. The list would include the FM Wireless Listening Devices Question Group container (1.2.2.1) as well as all its child question containers (1.2.2.1.1–1.2.2.1.6) and indicates the possible answers to each container; therefore the true/false questions display a true/false choice, while questions that use choice lists display a drop-down list with the choice list in it, etc.

Note that in this example, there are five possible answers to the choice list question and two possible answers to each of the five true/false questions. This creates 5×2×2×2×2×2=160 possible answer combinations. Since a not applicable and all false combination would result in no question being written, there are 160−1=159 permutations of sentences as referred to at the beginning of the prior paragraph. Include the random select between two items (3.5.2.1 selecting between 3.5.2.1.1 and 3.5.2.1.2) and there are 318 possible sentence combinations.

In 1106, the expert can reduce the number of permutations by locking in an answer to any of the containers (random selection cannot be locked in). So if the answer to the choice list question is locked down/as "Sound Field", then there are only 1×2×2×2×2×2=32 possible answer permutations that can result. It is at the expert's discretion to use this capability. Steps 1107 and 1108 are completed allowing for 1109 to occur. If a sentence does not read well, the expert can return to modify the end-product content using a combination of the following steps, eventually leaving the end-product analysis component when he is satisfied with the script; 1110, 901, 902, 904/905/906/907, 701, 702, 703, 720/722/723/724/725, 730, 703, 701, 902, 1109, 1111.

At the expert's discretion, he launches the SSA formulator (407, 1201, 1202), indicates the dialogs and end-products to appear in the SSA (1203), and prepares the SSA for use (1204, 1301–1307, 1205, 1401–1403, 1206).

Following preparation, the SSA user (a speech pathologist) opens the SSA (1501, 1502, 1503) in order to produce a report after having assessed a client (1601, 1602, 1610, 1611, 1613, 1615, 1616, 1504, 1701, 1703). The SSA user wants to indicate the client uses an FM hearing device. He therefore moves to the Rehabilitative Technology Topic (1706, 1708, 1901–1910, 1708, 1703, 1801–1809), answers the questions (1704). For example, the SSA user might provide the following answer set (answers in bold and underlined):

TABLE 1C

An SSA Users Answers to the Speech and Language Dialog

1. Speech and Language Assessment
    1.1. Oral Peripheral Exam Section
    1.2. Hearing Section
        1.2.1. Diagnosed Hearing Problem Topic
        1.2.2. Rehabilitative Technology Topic
            1.2.2.1. FM Wireless Listening Devices Question Group
                1.2.2.1.1. Style of System Question (Not Applicable; Behind-the-Ear (BTE); Personal; Educational; <u>Sound Field</u>)
                1.2.2.1.2. Is an FM System Used in the Classroom Question (<u>Yes</u>/No)
                1.2.2.1.3. Is an FM System Used at Home Question (<u>Yes</u>/No)
                1.2.2.1.4. Is an FM System Used in Theatres Question (<u>Yes</u>/No)
                1.2.2.1.5. Is an FM System Used in Therapy Question (<u>Yes</u>/No)
                1.2.2.1.6. Is an Environmental Microphone Used Question (<u>Yes</u>/No)
        1.2.3. History of Hearing Loss Topic
        1.2.4. Hearing Screening Topic
        1.2.5. Audiological Exam Results Topic Having moved to the next topic (1705, 1708, 1901–1910, 1708, 1703, 1801–1809), the SSA user has launched the rollup event (1903–1908), which generates (and stores) the rollup values for the non-snippet level containers in the topic hierarchy. Table ID indicates the containers whose rollup values are true (in bold and underlined):

TABLE 1D

Rollup Results Based on the SSA Users Answers to the Speech and Language Dialog

1. Speech and Language Assessment (True)
    1.1. Oral Peripheral Exam Section (False)
    1.2. Hearing Section (True)
        1.2.1. Diagnosed Hearing Problem Topic (False)
        1.2.2. Rehabilitative Technology Topic (True)
            1.2.2.1. FM Wireless Listening Devices Question Group (True)
                1.2.2.1.1. Style of System Question (Not Applicable; Behind-the-Ear (BTE); Personal; Educational; Sound Field)
                1.2.2.1.2. is an FM System Used in the Classroom Question (Yes/No)
                1.2.2.1.3. Is an FM System Used at Home Question (Yes/No)
                1.2.2.1.4. Is an FM System Used in Theatres Question (Yes/No)
                1.2.2.1.5. Is an FM System Used in Therapy Question (Yes/No)
                1.2.2.1.6. is an Environmental Microphone Used Question (Yes/No)
        1.2.3. History of Hearing Loss Topic (False)
        1.2.4. Hearing Screening Topic (False)
        1.2.5. Audiological Exam Results Topic (False)

As indicated in Table 1D, a non-default answer (default being Not Applicable for the choice list question and False for the true/false questions) to any question in 1.2.2.1.1–1.2.2.1.6 sets off a chain of events whereby item 1.2.2.1, which is the parent to all the questions under consideration, is set to true. Then its parentage, 1.2.2, 1.2, and 1 are all set to true. Note that these circumstances assume all these items had their rollup property set to true otherwise the rollup sequence would have stopped at the item which has its rollup property set to false.

Upon request, the SSA user generates an end-product (1505, 2000–2006). When the end-product generation process is launched, the hierarchy of the script is followed. The script hierarchy in this example is highly dependent on the results of rollup activity with a tight relationship maintained between the dialog and end-product hierarchy. Table 2C below indicates the results of conditional processing at the levels of the hierarchy based on the answers to questions and rollup values shown in Table 1D. Conditions that would pass are in bold and underlined. The corresponding rollup item from Table 1D contributing to the condition is in the parentheses.

TABLE 2C

Conditions That Pass in the High Level Model Due to the Rollup Capability

2. Speech and Language Report (passed, 1)
    2.1. Oral Peripheral Exam Narrative (did not pass, 1.1)
    2.2. Hearing Narrative (passed, 1.2)
        2.2.1. Diagnosed Hearing Problem Paragraph (did not pass, 1.2.1)
        2.2.2. Rehabilitative Technology Paragraph (passed, 1.2.2)
            2.2.2.1. Uses FM Wireless Hearing Devices Sentence (passed 1.2.2.1)
            2.2.2.2. Uses Hardwire Hearing Devices Sentence (did not pass, 1.2.2.2)
        2.2.3. History of Hearing Loss Paragraph (did not pass, 1.2.3)
        2.2.4. Hearing Screening Paragraph (did not pass, 1.2.4)
        2.2.5. Audiological Exam Results Paragraph (did not pass, 1.2.5)

Beginning at item 2 in Table 2C, the speech and language report was selected and its condition, which required the rollup value associated with item 1 in Table 1D, to pass, which it does. The first child below item 2, item 2.1 in Table 2C, is then considered. Its condition is dependent upon item 1.1 in Table 1D. Since the rollup value in 1.1 is false, the condition for 2.1 does not pass. Upon reaching item 2.2, the corresponding condition check indicates item 1.2 has a rollup value that is true. Given the condition is true, end-product generation moves on to the subordinates below 2.2.

The first subordinate level container is 2.2.1 whose condition relies on 1.2.1. In this case, the rollup value is false. The sentences that would be subordinate to this paragraph would therefore be bypassed. Instead, the process moves to the next subordinate of 2.2, which is 2.2.2. Once again, a rollup is referred to in this condition and it corresponds to 1.2.2. This time, the; value that is returned produces a true condition. The subordinates that comprise 2.2.2 are then analyzed.

The subordinates to 2.2.2 are sentences, the first of which is the Uses FM Wireless Devices Sentence (2.2.2.1). This sentence generates narrative on the use of wireless devices when item 1.2.2.1 (FM Wireless Listening Devices Question Group) is true. Since this is the case, the sentence is processed.

Table 3C indicates the resulting narrative generation events that will occur given the container conditions that will pass as true based on the answers to the dialog questions as noted in Table 1C. Affected containers are underlined.

TABLE 3C

Result of Analyzing Conditions in Uses FM Wireless Devices Sentence Script

3. Sentence: FM Wireless Listening Devices Question Group is true
   3.1. Snippet: retrieve and include {What is the First Name of the Child}
   3.2. Snippet: include text "uses"
   3.3: Phrase: Apply "a" or "an" method to the text that is returned
      3.3.1. Phrase: {Style of System} is Sound Field therefore it is true
         3.3.1.1. Snippet: Translate Style of System
      3.3.2. Snippet: include text "FM system"
   3.4. Phrase: {Is an Environmental Microphone Used} is true
      3.4.1. Snippet: include "with en environmental microphone"
   3.5. Phrase: Apply "comma, comma, and" wrap list method
      3.5.1. Phrase: {Is an FM System Used at Home} is true
         3.5.1.1. Snippet: include "at home"
      3.5.2. Phrase: {Is an FM System Used in the Classroom} is true
         3.5.2.1. Phrase: Randomly select one of the following
            3.5.2.1.1. Snippet: include "in class"
            3.5.2.1.2. Snippet: include "in the classroom"
      3.5.3. Phrase: {Is an FM System Used in Theatres} is true
         3.5.3.1. Snippet: include "in theatres"

The first subordinate of item 3 in Table 3C, item 3.1, is a snippet that refers to the first name of the assessed child (question is not shown) which is retrieved from the SSA IDS (220; assume it to be John). The second subordinate, item 3.2, is a snippet that offers up the literal text "uses". So far, the sentence is comprised of the snippets "John" and "uses".

Step 3.3 is a phrase that waits for the result of its subordinate analysis to determine whether to apply a method against the assembled text to choose whether it should be preceded by an "a" or "an". The sequence returns to this step once the subordinates are analyzed. Item 3.3.1 retrieves the answer to item 1.2.2.1.1. Since the answer is other than "Not Applicable" (i.e., it is "Sound Field"), the condition for item 3.3.1 is true and subordinate 3.3.1.1 will be analyzed prior to moving on to 3.3.2. According to item 3.3.1.1 (which has no condition), the translation list for the choice list of this question must be accessed and the translation for "Sound Field" retrieved. The translation text is "sound field" which is the text result of 3.3.1.1.

The text of 3.3.1.1 is passed back to the phrase at 3.3.1. Item 3.3.1 has no further subordinates to analyze so it passes its text back to 3.3. Item 3.3 recognizes another subordinate at 3.3.2 and begins to analyze that container. Item 3.3.2 is comprised of the text snippet "FM system" which it also returns to 3.3. Now 3.3.1 and 3.3.2 have combined to provide the snippets "sound field" and "FM system" to the phrase at 3.3. Item 3.3 is completed when the precede by "a" or an method determines that an "an" should be applied to the first word delivered to it by recognizing the initial consonant in "sound". Item 3.3 has assembled and will pass up the phrase "a sound field FM system" to item 3. Items 3.1, 3.2, and 3.3 have respectively contributed "John", "uses", "a sound field FM system" to the sentence through this point.

End-product generation is back at item 3, which recognizes another subordinate at item 3.4. Since the condition at 3.4 is passed, the item at 3.4.1 is analyzed resulting in the snippet "with an environmental microphone" being passed back through 3.4 to 3.

Item 3.5 indicates another phrase formatting property referred to as the wrap list function. Item 3.5 waits for the text of Item 3.5.1, 3.5.2, and 3.5.3 to be passed up to it before implementing the wrap list function. Given these subordinate containers have true conditions, 3.5.1 and 3.5.3 receive and pass up.5 text "at home" from 3.5.1.1 and "in theatres" from 3.5.3.1 respectively. Item 3.5.2 indicates a randomly selection feature of the end-product generator. In this case, the phrase selects between equivalent but different versions of two text snippets; the first being "in class" (item 3.5.2.1), the second being "in the classroom" (item 3.5.2.2). Either text snippet, in the context of the completed sentence, will provide an acceptable syntactical structure. Assume that "in the classroom" is selected and passed up the hierarchy from 3.5.2.1.2 to 3.5.

As such, the three text items "at home", "in the classroom", and "in theatres" are now in the possession of phrase 3.5. As such, the wrap list function determines how many text items there are and begins inserting commas and "and" conjunctions. Note that other answer combinations could result in a different combination of these three snippets to be in the possession of phrase 3.5. If only one text item had been passed back, no insertion of commas or the "and" would take place. With two text items, an "and" would be inserted between them. With three or more, the leading text items have commas inserted after them and the last item has an "and" placed between it and the prior text item. The wrap list function has iterations that use "or" instead of "and", semi-colons instead of commas, etc. In this case, the method assembles the three text items into the phrase "at home, in the classroom, and in theatres". This is then passed back to item 3 and is incorporated into the sentence.

The sentence that is item 3 possesses text items of "John", "uses", "a sound field FM system", "with an environmental microphone", and "at home, in the classroom, and in theatres". The sentence container has methods that capitalize the first letter (if it is not already capitalized) and appends two spaces at the front of the sentence. As a result, item 3 has assembled "John uses a sound field FM system with an environmental microphone at home, in the classroom, and in theatres". Table 3D summarizes the text flow that contributes to the sentence that is item 3.

TABLE 3D

Text Returned by Each Container From the Uses FM Wireless Devices Sentence Script 3. John uses a sound field FM system with an environmental microphone at home, in the classroom, and in theatres
   3.1. John
   3.2. uses
   3.3. a sound field FM system
      3.3.1. sound field
         3.3.1.1. sound field
      3.3.2. FM system
   3.4. with an environmental microphone
      3.4.1. with an environmental microphone TABLE 3D-continued Text Returned by Each Container From the Uses FM Wireless Devices Sentence Script

```
3.5. at home, in the classroom, and in theatres
    3.5.1. at home
        3.5.1.1. at home
    3.5.2. in the classroom
        3.5.2.1. in the classroom
            3.5.2.1.1. in class
            3.5.2.1.2. in the classroom
    3.5.3. in theatres
        3.5.3.1. in theatres
```

Item 3, which is equivalent to item 2.2.2.1, then passes that text back up to item 2.2.2 which then determines if item 2.2.2.2 should be analyzed. The analysis continues in this fashion until the entire script has been navigated and a completed end-product generated.

Upon completion, steps 2007 and 2008 are conducted putting the SSA user back at the dialog manager (232) and at step 1504. From there, the SSA user is likely to exit the SSA via step 1509.

Although the present invention has been described in detail, it should be understood that various changes, substitutions and alterations can be made hereto without departing from the spirit and scope of the invention as defined by the appended claims.

What is claimed is:

1. An end-product generation component for a computerized system of knowledge architecture, the component comprising:

A) a hierarchical end-product script having contributing levels, the end-product script being: (i) related to a specific subject matter, (ii) developed and organized by an expert in the specific subject matter, and (iii) adapted to be processed with contributing values provided by a user who has previously established findings and opinions related to the specific subject matter;

B) a data structure having contributing values provided by the user;

C) a permutator for processing the contributing values with the contributing levels to generate a finite group of alternative sentences; and D) a selector for selecting a sentence from the finite group of alternative sentences, whereby two narrative end products generated from the same contributing values will appear similar, but not identical, wherein an end-product generated by the end-product generation component comprises narrative components selected from the group consisting of text, graphics, charts, tables, and combinations thereof, the narrative components having a format that is readily presentable and readable to communicate the user's previously established findings and opinions related to the specific subject matter, which findings and opinions are provided to the computerized system of knowledge architecture by the user as answers in response to questions that are developed and organized by the expert as a hierarchy of topics and associated questions for display by the computerized system of knowledge architecture.

\* \* \* \* \*